(12) United States Patent
Kim et al.

(10) Patent No.: US 10,505,673 B2
(45) Date of Patent: Dec. 10, 2019

(54) METHOD AND APPARATUS FOR DETECTING A SIGNAL IN A WIRELESS COMMUNICATION SYSTEM

(71) Applicants: Samsung Electronics Co., Ltd., Suwon-si, Gyeonggi-do (KR); Industry-Academic Cooperation Foundation, Yonsei University, Seoul (KR)

(72) Inventors: Jaewon Kim, Seoul (KR); Sooyong Choi, Seoul (KR); Gyuyeol Kong, Seoul (KR); Junggyun Park, Seoul (KR)

(73) Assignees: Samsung Electronics Co., Ltd., Suwon-si (KR); Industry-Academic Cooperation Foundation, Yonsei University, Seoul (KR)

(*) Notice: Subject to any disclaimer, the term of this patent is extended or adjusted under 35 U.S.C. 154(b) by 0 days.

(21) Appl. No.: 15/916,795

(22) Filed: Mar. 9, 2018

(65) Prior Publication Data

US 2018/0262300 A1    Sep. 13, 2018

(30) Foreign Application Priority Data

Mar. 9, 2017  (KR) .................. 10-2017-0030254

(51) Int. Cl.
*H04L 25/03*  (2006.01)
*H04L 1/00*  (2006.01)
(Continued)

(52) U.S. Cl.
CPC ........ *H04L 1/0054* (2013.01); *H04L 25/0228* (2013.01); *H04L 25/03006* (2013.01);
(Continued)

(58) Field of Classification Search
CPC ..... H04L 2025/03426; H04L 25/03242; H04L 1/0054; H04L 25/0228; H04L 25/03891; H04L 1/0057
(Continued)

(56) References Cited

U.S. PATENT DOCUMENTS 8,634,490 B2    1/2014  Chockalingam et al.
2004/0072594 A1*  4/2004  Hwang ............... H04B 7/0669
                                                    455/562.1

(Continued)

OTHER PUBLICATIONS

Im et al.; MMSE-OSIC2 Signal Detection for Spatially Multiplexed MIMO Systems; IEEE; 2008.
(Continued)

*Primary Examiner* — Emmanuel Bayard
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments of the present disclosure, a method for operating a receiving device in a wireless communication system is provided. The method includes receiving a signal from a transmitting device which includes a plurality of transmit antennas, determining, based on the signal, multiple symbol vectors from symbol vectors possibly transmitted from a first transmit antenna and a second transmit antenna of the plurality of transmit antennas, and determining combinations of symbols transmitted from the first transmit antenna and the second transmit antenna by searching, for each of the multiple symbol vectors, at least one other symbol vector within a first preset distance from each of the multiple symbol vectors.

18 Claims, 18 Drawing Sheets

(51) Int. Cl.
  *H04L 25/02* (2006.01)
  *H04W 4/70* (2018.01)
(52) U.S. Cl.
  CPC ............. *H04L 25/03891* (2013.01); *H04L 2025/0342* (2013.01); *H04W 4/70* (2018.02)
(58) Field of Classification Search
  USPC .............................. 375/265, 299, 347–349
  See application file for complete search history.

(56) References Cited

U.S. PATENT DOCUMENTS

| | | | | |
|---|---|---|---|---|
| 2005/0094742 A1* | 5/2005 | Yee | ............. | H03M 13/00 375/267 |
| 2005/0135498 A1* | 6/2005 | Yee | ............. | H04L 1/0631 375/267 |
| 2006/0203928 A1* | 9/2006 | Cheun | ............. | H04L 1/0631 375/267 |
| 2007/0182619 A1* | 8/2007 | Honda | ............. | G01S 13/931 342/80 |
| 2012/0263080 A1* | 10/2012 | Cho | ............. | H04B 7/0434 370/310 |
| 2013/0343468 A1* | 12/2013 | Ko | ............. | H04H 20/42 375/240.25 |
| 2014/0269922 A1* | 9/2014 | Nagaoka | ............. | H04N 19/56 375/240.16 |
| 2015/0078477 A1* | 3/2015 | Hong | ............. | H04L 27/2602 375/295 |
| 2015/0355315 A1* | 12/2015 | Shimizu | ............. | G01S 13/34 342/107 |

OTHER PUBLICATIONS

Srinidhi et al.; Layered Tabu Search Algorithm for Large-MIMO Detection and a Lower Bound on ML Performance; IEEE Transactions on Communications; vol. 59; No. 11; Nov. 2011.

* cited by examiner

| I = 1 | I = 2 | I = 3 | ~1200 |
|---|---|---|---|
| 1 | -1 | -3 | |
| -1 | -1 | -3 | |
| 3 | -3 | -3 | |
| 3 | 1 | -3 | |
| 3 | -1 | -1 | |
| 3 | -1 | 1 | |

FIG.12A

| I = 1 | I = 2 | I = 3 | ~1210 |
|---|---|---|---|
| 1 | -1 | -3 | |
| -1 | 1 | -3 | |
| 3 | -3 | -3 | |
| 3 | 1 | -3 | |
| 3 | -1 | -1 | |
| 3 | -1 | 1 | |

FIG.12B

| I = 1 | I = 2 | I = 3 | ~1220 |
|---|---|---|---|
| 1 | -1 | -3 | |
| -1 | 1 | -3 | ⟩ REPLACE |
| -3 | -1 | -3 | |
| 3 | -3 | -3 | |
| 3 | 1 | -3 | |
| 3 | -1 | -1 | |
| 3 | -1 | 1 | |

FIG.12C

METHOD AND APPARATUS FOR DETECTING A SIGNAL IN A WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0030254, filed on Mar. 9, 2017, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Industry-Academic Cooperation Foundation, Yonsei University.

TECHNICAL FIELD

The disclosure relates to a wireless communication system. More particularly, the disclosure relates to an apparatus and a method for detecting a signal in the wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

High-order modulation/demodulation used to transmit and receive signals in the wireless communication system can increase transmission efficiency in limited frequency resources. For example, the high-order modulation/demodulation can allocate more bits to one transmit symbol. When such high-order modulation/demodulation is applied to a MIMO system, communication capacity can dramatically grow without additional frequency allocation or power increase. However, as the number of transmit antennas and the modulation order increase, computational complexity exponentially increases. In this respect, what is demanded is a reception method with high complexity in order to achieve near-maximum likelihood (ML) performance in signal detection.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for efficiently detecting a signal in a wireless communication system.

Another aspect of the disclosure is to provide a method and an apparatus for improving bit error rate (BER) performance of a received signal.

Another aspect of the disclosure is to provide a method and an apparatus for reducing latency in signal detection.

Another aspect of the disclosure is to provide a method and an apparatus for improving reception performance by performing a symbol vector search for each of a plurality of symbol vectors.

In accordance with an aspect of the disclosure, a method for operating a receiving device in a wireless communication system is provided. The method includes receiving a signal from a transmitting device which includes a plurality of transmit antennas, determining, based on the signal, multiple symbol vectors from symbol vectors possibly transmitted from a first transmit antenna and a second transmit antenna of the plurality of transmit antennas, and determining combinations of symbols transmitted from the first transmit antenna and the second transmit antenna by searching, for each of the multiple symbol vectors, at least one other symbol vector within a first preset distance from each of the multiple symbol vectors.

In accordance with another aspect of the disclosure, an apparatus of a receiving device in a wireless communication system is provided. The apparatus includes a transceiver configured to receive a signal from a transmitting device which includes a plurality of transmit antennas, and at least one processor configured to determine, based on the signal, multiple symbol vectors from symbol vectors possibly transmitted from a first transmit antenna and a second transmit antenna of the plurality of transmit antennas, and determine combinations of symbols transmitted from the first transmit antenna and the second transmit antenna by searching, for each of the multiple symbol vectors, at least one other symbol vector within a first preset distance from each of the multiple symbol vectors.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A, 12B, and 12C depict a table for symbol vector search according to various embodiments of the disclosure.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure to be described below, a hardware approach will be described as an example. However, since the various embodiments of the disclosure include a technology using both hardware and software, the disclosure does not exclude a software-based approach.

Hereafter, the disclosure provides an apparatus and a method for detecting a signal in a wireless communication system. More specifically, the disclosure provides operations for improving bit error rate (BER) performance for signal detection and reducing complexity and latency, by searching a plurality of symbol vectors individually.

Terms indicating control information, terms indicating operation status (e.g., step, operation, procedure), terms indicating data (e.g., information, bit, symbol), terms indicating network entities (e.g., receiving device, transmitting device), terms indicating messages (e.g., signal, data, signaling, symbol, stream), and terms indicating components of a device are mentioned for the sake of explanations. Accordingly, the disclosure is not limited to the terms to be described, and can use other terms having technically identical meaning Various embodiments of the disclosure can be easily used and applied to other communication system. While the disclosure explains one-way communication to ease the understanding, the apparatus and the method according to various embodiments can be applied to two-way communication.

Figure 1:
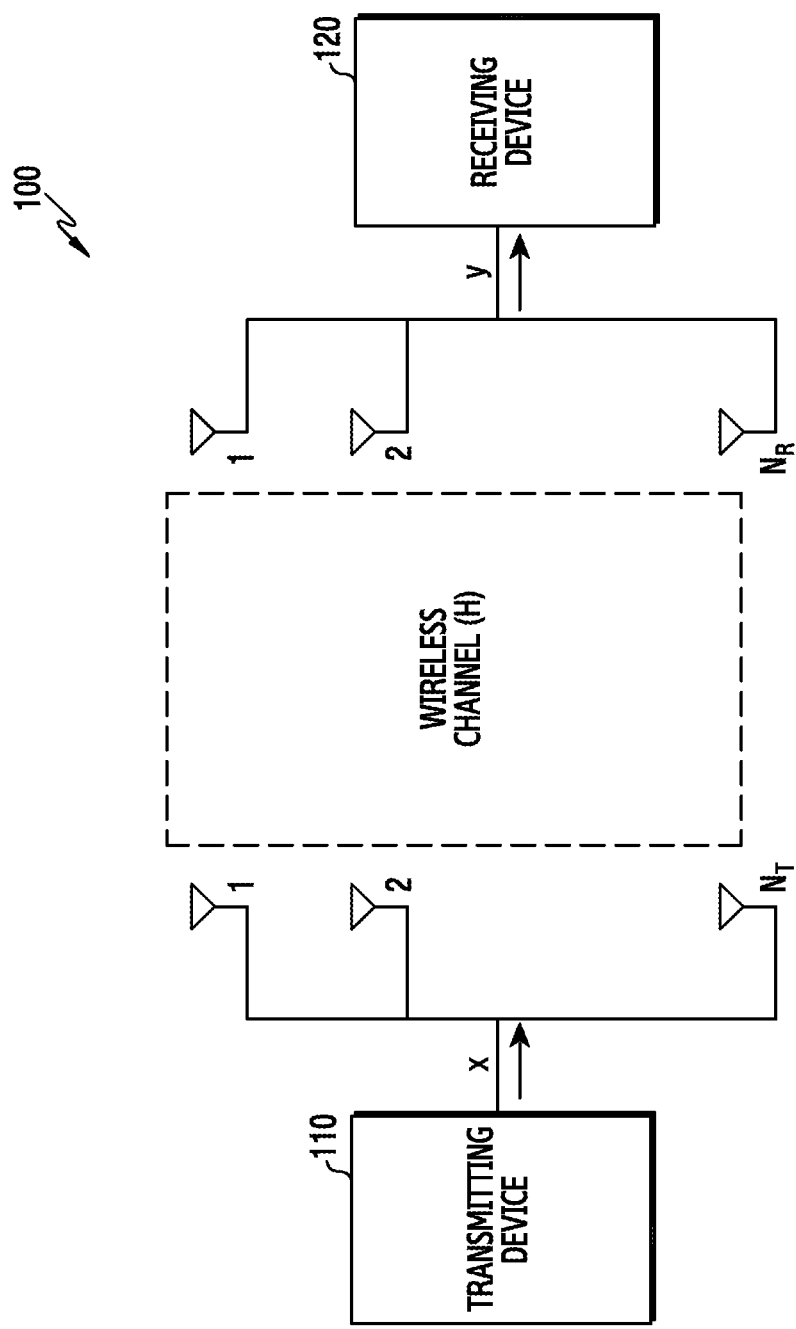
FIG. 1 depicts a wireless communication environment according to an embodiment of the disclosure.

FIG. 1 depicts a wireless communication environment 100 according to an embodiment of the disclosure. The wireless communication environment 100 can include a transmitting device 110 and a receiving device 120.

Referring to FIG. 1, the transmitting device 110 can transmit a signal to the receiving device 120. That is, the receiving device 120 can receive a signal from the transmitting device 110. To detect a signal, the receiving device 120 can support a plurality of reception algorithms. For example, the receiving device 120 can support at least one of maximum likelihood (ML), zero forcing (ZF), minimum mean square error (MMSE), MMSE-successive interference cancellation (SIC), and integer forcing (IF). The receiving device 120 can select one of the reception algorithms, based on its control information or setting information or information measured by the transmitting device 110, and use the selected algorithm to process the received signal.

The transmitting device 110 and the receiving device 120 are divided based on the signal transmission direction. Accordingly, when the signal transmission direction changes, the transmitting device 110 can serve as the receiving device 120 and the receiving device 120 can serve as the transmitting device 110. For example, in downlink communication, the transmitting device 110 can be a base station and the receiving device 120 can be a terminal. For example, in uplink communication, the transmitting device 110 can be a terminal and the receiving device 120 can be a base station. In device to device (D2D) communication, the transmitting device 110 can be one terminal and the receiving device 120 can be the other terminal. Herein, the D2D communication can be referred to as sidelink communication. The transmitting device 110 can be a base station and the receiving device 120 can be another base station. Besides, the transmitting device 110 and the receiving device 120 can be other various devices.

Herein, the base station is a network element which provides a radio access to the terminal. The base station can be referred to as an access point (AP), an eNodeB (eNB), a $5^{th}$ Generation node (5G node), a 5G NodeB, (NB), a wireless point, a transmission/reception point (TRP), or other term having technically identical meaning Herein, the terminal is used by a user and communicates with the base station over a wireless channel The terminal can be referred to as a user equipment (UE), a mobile station, a subscriber station, a remote terminal, a wireless terminal, an electronic device, a user device, or other term having technically identical meaning A signal received at the receiving device 120 can be expressed as Equation 1.

$$Y=HX+Z \qquad \text{Equation 1}$$

Y denotes the signal received at the receiving device 120, and X denotes the signal transmitted by the transmitting device 110. H denotes a channel matrix between the transmitting device 110 and the receiving device 120. Z denotes a noise of the channel When the transmitting device 110 includes $N_T$-ary antennas and the receiving device 120 includes $N_R$-ary antennas, X can be a vector of $N_T \times 1$ size, Y can be a vector of $N_R \times 1$ size, and H can be a vector of $N_R \times N_T$ size.

Now, the transmitting device and the receiving device are divided in FIG. 2 through FIG. 13 for the explanations, but their functions are not limited by their names.

Figure 2:
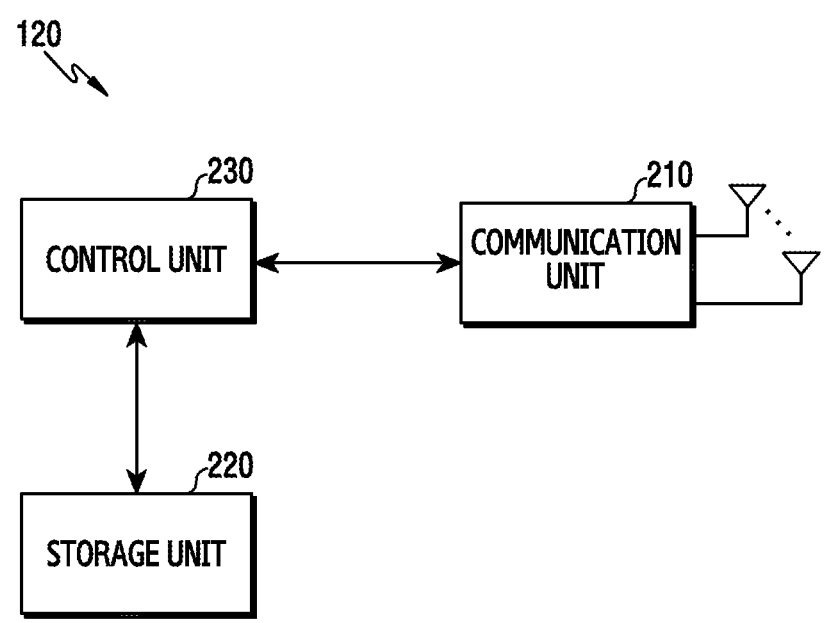
FIG. 2 depicts a functional structure of a receiving device in a wireless communication system according to an embodiment of the disclosure.

FIG. 2 is a block diagram of the receiving device 120 in a wireless communication system according to an embodiment of the disclosure.

FIG. 2 can depict construction of the receiving device 120 of FIG. 2. A term such as 'portion' or '~ er' indicates a unit for processing at least one function or operation, and can be implemented using hardware, software, or a combination of hardware and software. As the functions of the device are not limited by their name as mentioned above, the receiving device 120 embraces the configuration for receiving a signal from the transmitting device 110 and the configuration for transmitting a signal to the transmitting device 110.

Referring to FIG. 2, the receiving device 120 can include a communication unit 210, a storage unit 220, and a control unit 230.

The communication unit 210 can transmit and receive signals over a wireless channel For example, the communication unit 210 performs a conversion function between a baseband signal and a bit sequence according to a physical layer standard of the system. For example, in control information transmission, the communication unit 210 generates modulation symbols by encoding and modulating a transmit bit sequence. Also, in data reception, the communication unit 210 can restore a receive bit sequence by demodulating and decoding a baseband signal. Further, the communication unit 210 can up-convert the baseband signal to a radio frequency (RF) band signal, transmit it via an antenna, and down-convert an RF band signal received via an antenna to a baseband signal. For example, the communication unit 210 can include a decoder, a demodulator, an analog to digital convertor (ADC), a receive filter, an amplifier, a mixer, an oscillator, and so on. For the signal transmission, the communication unit 210 can further include an encoder, a modulator, a digital to analog convertor (DAC), a transmit filter, and so on.

The communication unit 210 can include a plurality of antennas. The communication unit 210 can receive a plurality of streams over the antennas respectively. The communication unit 210 can include a plurality of RF chains. Further, the communication unit 210 can perform beamforming For the beamforming, the communication unit 210 can control a phase and an amplitude of signals transmitted/received over the antennas or antenna elements, that is, conduct analog beamforming Alternatively, the communication unit 210 can beamform a digital signal, that is, conduct digital beamforming The communication unit 210 can include different communication modules for processing signals of different frequency bands. Further, the communication unit 210 can include a plurality of communication modules to support different radio access techniques. For example, different radio access techniques can include Bluetooth low energy (BLE), Wireless Fidelity (Wi-Fi), WiFi gigabyte (WiGig), and a cellular network (e.g., long term evolution (LTE), LTE-advanced (LTE-A), $5^{th}$ generation (5G) network). The different frequency bands can include a super high frequency (SHF) (e.g., 2.5 GHz, 5 GHz) band and a millimeter weave (e.g., 30 GHz, 60 GHz) band.

As such, the communication unit 210 transmits and receives the signals. Hence, the communication unit 210 can be referred to as a transmitter, a receiver, or a transceiver. Hereafter, the transmission and the reception over the wireless channel embraces the above-stated processing of the communication unit 210.

The storage unit 220 stores a basic program for operating the receiving device 120, an application program, and data such as setting information. The storage unit 220 can include a volatile memory, a non-volatile memory, or a combination of a volatile memory and a non-volatile memory. The storage unit 220 provides the stored data in response to a request of the control unit 230.

The control unit 230 controls general operations of the receiving device 120. For example, the control unit 230 can transmit and receive signals through the communication unit 210. Also, the control unit 230 can record and read data in and from the storage unit 220. For doing so, the control unit 230 can include at least one processor or microprocessor, or can be a part of a processor. Part of the communication unit 210 and the control unit 230 can be referred to as a communication processor (CP). In particular, the control unit 230 can detect symbols received from the transmitting device 110 based on a reception algorithm, and decode a signal according to various embodiments. The control unit 230 can include at least one of an operator which performs calculation, an equalizer, and a detector. The operator, the equalizer, and the detector can be, as an instruction set or code stored in the storage unit 220, instructions/code resided at least temporarily in the control unit 230, a storage space storing the instructions/code, or part of a circuitry of the control unit 230.

The equalizer can cancel or reduce noise or inter-symbol interference (ISI) of the signal received through the communication unit 210. The detector can detect a value of the received symbol. Also, the detector can perform decision (e.g., hard decision, soft decision) from a probability of a bit value.

FIG. 2 is a block diagram of the receiving device 120. Herein, when the configuration of FIG. 2 corresponds to base station, the receiving device 120 can further include a backhaul communication unit which provides an interface for communicating with a backhaul network.

The environment and the device for the signal reception have been described in FIG. 1 and FIG. 2. Now, a first scheme 300 and a second scheme 310 for the signal detection shall be explained in FIG. 3A and FIG. 3B, and terms used for the signal detection in various embodiments of the disclosure shall be defined.

Figure 3A:
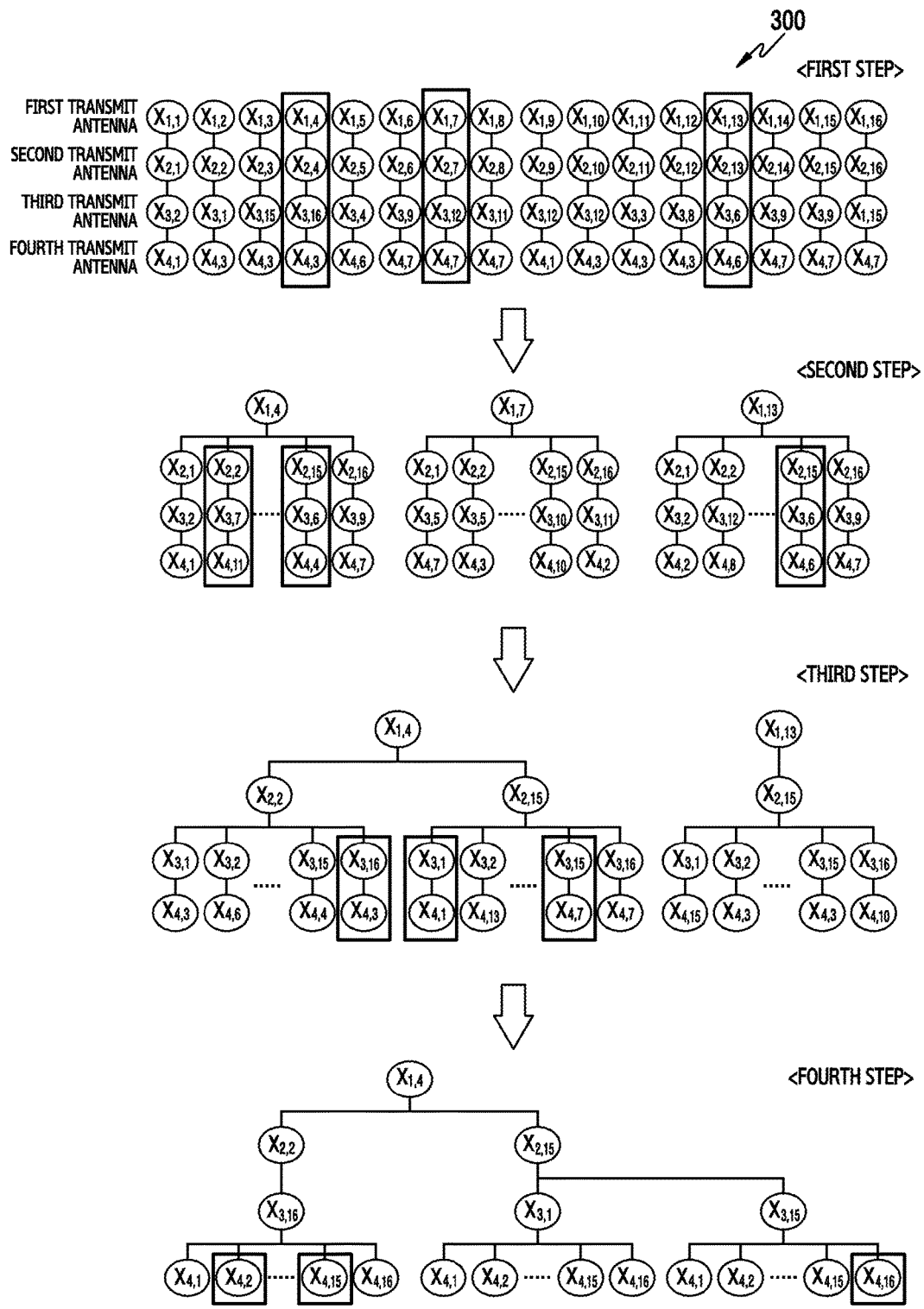
FIG. 3A depicts signal detection of a first scheme according to an embodiment of the disclosure.

FIG. 3A depicts signal detection of the first scheme 300 according to an embodiment of the disclosure.

Referring to FIG. 3A, it is assumed that the receiving device 120 receives and detects a signal transmitted via, but not limited to, four transmit antennas (a first transmit antenna, a second transmit antenna, a third transmit antenna, and a fourth transmit antenna) of the transmitting device 110. Various embodiments of the disclosure can be identically applied to the receiving device 120 which receives a signal transmitted via a various number of antennas of the transmitting device 110. In various embodiments of the disclosure, the signal detection can include detecting a symbol which is transmitted via transmit antennas (e.g., a first transmit antenna, a second transmit antenna, a third transmit antenna, and a fourth transmit antenna) of the receiving device 120.

The symbol detection of the first scheme 300 can include four steps as shown in FIG. 3A, because the receiving device 120 receives the signal transmitted via the four transmit antennas of the transmitting device 110. For example, when the receiving device 120 receives a signal transmitted via a different number of transmit antennas, the symbol detection of the first scheme 300 can include steps in the different number.

At each step, the receiving device 120 can sequentially determine symbols estimated to be transmitted from the transmit antennas respectively. For example, the receiving device 120 can determine the symbols estimated to be transmitted from the first transmit antenna in the first step, cancel interference from the received signal in the second step on the premise that the symbols determined in the first step are transmitted via the first transmit antenna, and determine symbols estimated to be transmitted from the second transmit antenna, from the interference-free signal. By repeating this process, in the third step and the fourth step, the receiving device 120 can determine symbols estimated to be transmitted from the third transmit antenna and determine symbols estimated to be transmitted from the fourth transmit antenna. Namely, the receiving device 120 determines the symbols estimated to be transmitted from the transmit antennas in the order of 'the first antenna→the second transmit antenna→the third transmit antenna→the fourth transmit antenna'. Herein, the order of 'the first antenna→the second transmit antenna→the third transmit antenna→the fourth transmit antenna' can be the order of channel status of the transmit antennas. In other words, the channel status of the first transmit antenna can be best, and the channel status of the fourth transmit antenna can be worst. The channel status of a particular transmit antenna can be defined as, for example, a norm value of a vector corresponding to the particular transmit antenna in the channel matrix H.

Now, the steps are described in further detail. In FIG. 3A, a notation $x_{p,q}$ denotes that a symbol x of an index q is transmitted from a transmit antenna p.

In the first step, the receiving device 120 determines the symbols estimated to be transmitted from the first transmit antenna. For doing so, the receiving device 120 can determine a temporary solution vector for each of symbols possibly transmitted from the first transmit antenna. Herein, the possibly transmitted symbols indicate any symbols corresponding to a modulation order. For example, when the modulation order is 4 (i.e., 16-quadrature amplitude modulation (QAM) is applied to modulate a signal), the possibly transmitted symbols can indicate 16 symbols in a constellation corresponding to the 16-QAM. As such, the possibly transmitted symbols can be defined in other cases than the modulation order of 4. When the modulation order is 4, the possibly transmitted symbols from the first transmit antenna can include $x_{1,1}$, $x_{1,2}$, L, $x_{1,16}$ as shown in FIG. 3A. The temporary solution vector can indicate a combination of the symbols estimated to be transmitted from the transmit antennas according to a particular metric or scheme, and the solution vector can indicate one temporary solution vector finally determined among the temporary solution vectors. Hereafter, the combination of the symbols can be referred to as a symbol combination or a symbol vector. For example, the temporary solution vector for the symbol $x_{1,1}$ possibly transmitted from the first transmit antenna can be determined to $[x_{1,1}, x_{2,1}, x_{3,2}, x_{4,1}]$ according to MMSE-ordered successive interference cancellation (OSIC) as shown in FIG. 3A. The MMSE-OSIC cancels interference from the determined symbol in the received signal and determines next symbols in sequence. Hence, with the symbol $x_{1,1}$, the receiving device 120 can sequentially determine $x_{2,1}$, $x_{3,2}$, and $x_{4,1}$ according to the MMSE-OSIC and thus determine the temporary solution vector $[x_{1,1}, x_{2,1}, x_{3,2}, x_{4,1}]$ for $x_{1,1}$. As such, the receiving device 120 can determine the temporary solution vector for each of the symbols $x_{1,1}$, $x_{1,2}$, L,$x_{1,16}$ possibly transmitted from the first antenna. Sixteen temporary solution vectors can be determined in the first step as shown in FIG. 3A.

After determining the temporary solution vectors of the possibly transmitted symbols of the first transmit antenna, the receiving device 120 can determine a metric value of the temporary solution vectors. For example, the metric value can be a size of a ML metric. When a transmit signal $x_{ML}$ is estimated by the ML metric, $x_{ML}$ can be expressed as Equation 2.

$$x_{ML} = \arg\min \|y - Hx\| \qquad \text{Equation 2}$$

In Equation 2, $x_{ML}$ denotes the transmit signal vector estimated with the ML metric, x denotes the transmit signal vector, y denotes a receive signal vector, and H denotes the channel matrix between the transmitting device 110 and the receiving device 120. According to various embodiments of the disclosure, $\|y-Hx\|$ (or its n-th power, where n is a real number greater than zero) of Equation 2 can be referred to as an ML metric value or a ML metric size.

Based on the metric values of the temporary solution vectors, the receiving device 120 can determine temporary solution vectors in a predetermined number among the temporary solution vectors. In FIG. 3A, three temporary solution vectors $[x_{1,4}, x_{2,6}, x_{3,16}, x_{4,9}]$, $[x_{1,7}, x_{2,9}, x_{3,12}, x_{4,7}]$, and $[x_{1,13}, x_{2,15}, x_{3,6}, x_{4,6}]$ are determined in ascending order of the ML metric size (the predetermined number=3) in the first step. However, the three temporary solution vectors are exemplary, and the predetermined number can determine the temporary solution vectors in various numbers. The receiving device 120 can extract symbols corresponding to the first transmit antenna from the predetermined number of the temporary solution vectors, and thus determine the symbols estimated to be transmitted from the first transmit antenna. In FIG. 3A, among the three determined temporary solution vectors, the symbols $x_{1,4}$, $x_{1,7}$, and $x_{1,13}$ corresponding to the first transmit antenna can be estimated to be transmitted from the first transmit antenna.

In the second step, the receiving device 120 determines temporary solution vectors for combinations of the symbols determined in the first step and symbols possibly transmitted from the second transmit antenna. Herein, combinations of a set A={a1,a2} and a set B={b1,b2,b3} can indicate all or part of a product set C={(a1,b1),(a1,b2),(a1,b3),(a2,b1),(a2,b2),(a3,b2)} of the set A and the set B, and one combination can indicate one of the elements of the product set C. In FIG. 3A, the combinations of the three symbols determined in the first step and sixteen symbols (16-QAM) possibly transmitted from the second transmit antenna can be defined as 3×16=48 symbol vectors. Similarly to the first step, the receiving device 120 can determine temporary solution vectors for the 48 combinations according to the MMSE-OSIC. For example, the receiving device 120 can determine $x_{3,2}$ and $x_{4,1}$ in sequence for the symbol vector (or combination) $[x_{1,4}, x_{2,1}]$ according to the MMSE-OSIC, and thus determine the temporary solution vector $[x_{1,4}, x_{2,1}, x_{3,2}, x_{4,1}]$ for the symbol vector $[x_{1,4}, x_{2,1}]$. As such, the receiving device 120 can determine the temporary solution vector of each of the 48 combinations. Next, the receiving device 120 can determine a predetermined number of temporary solution vectors among the temporary solution vectors based on the metric values of the temporary solution vectors. In FIG. 3A, the three temporary solution vectors $[x_{1,4}, x_{2,2}, x_{3,7}, x_{4,11}]$, $[_{1,4}, x_{2,15}, x_{3,6}, x_{4,4}]$, and $[x_{1,13}, x_{2,15}, x_{3,6}, x_{4,6}]$ are determined in order of the ML metric size in the second step. The receiving device 120 can extract the symbol vectors corresponding to the first transmit antenna and the second transmit antenna from the predetermined number of the temporary solution vectors, and thus determine symbol vectors estimated to be transmitted from the first transmit antenna and the second transmit antenna. In FIG. 3A, the symbol vectors $[x_{1,4}, x_{2,2}]$, $[x_{1,4}, x_{2,15}]$, and $[x_{1,13}, x_{2,15}]$ corresponding to the first transmit antenna and the second transmit antenna among the three temporary solution vectors determined can be estimated to be transmitted from the first transmit antenna and the second transmit antenna.

In the third step and the fourth step, the receiving device 120 can determine a temporary solution vector for each of combinations of the symbol vectors determined in the previous step and the symbols possibly transmitted from the transmit antenna (the third transmit antenna in the third step, the fourth transmit antenna in the fourth step). Next, the receiving device 120 can perform the same operation as the operation after the receiving device 120 determines the temporary solution vectors for the combinations in the second step. After the fourth step is finished, the symbol vector estimated to be transmitted from the transmit antennas of the transmitting device 110 can be determined For example, symbol vectors $[x_{1,4}, x_{2,2}, x_{3,16}, x_{4,2}]$, $[x_{1,4}, x_{2,2}, x_{3,16}, x_{4,16}]$, and $[x_{1,4}, x_{2,15}, x_{3,15}, x_{4,16}]$ are estimated to be transmitted from the transmit antennas in FIG. 3A. The receiving device 120 can determine, as a final solution vector, the symbol vector having the best metric value among the predetermined number of the symbol vectors after the fourth step. Herein, the first scheme 300 can be referred to as MMSE-OSIC².

The signal detection of the first scheme 300 considers all of the symbols possibly transmitted from the transmit antennas, and thus can exhibit high complexity. Also, since the symbol vector is determined in the next step based on the symbol or the symbol vector determined in each step, error propagation can occur when the symbol or symbol vector of the previous step is not selected adequately.

Figure 3B:
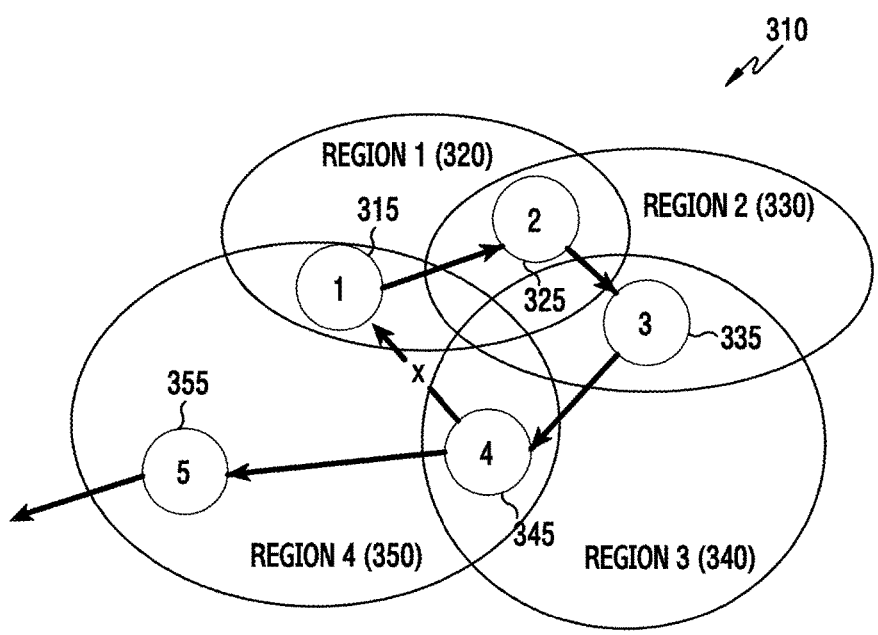
FIG. 3B depicts signal detection of a second scheme according to an embodiment of the disclosure.

FIG. 3B depicts signal detection of the second scheme 310 according to an embodiment of the disclosure.

Referring to FIG. 3B, according to the second scheme 310, the receiving device 120 can search temporary solution vectors in order of 'a first symbol vector 315→a second symbol vector 325→a third symbol vector 335→a fourth symbol vector 345→a fifth symbol vector 355', and determine the best solution vector. The best solution vector search based on the second scheme 310 is now elucidated.

To search for the second symbol vector 325 from the first symbol vector 315, the receiving device 120 can determine a first region 320 which is a neighboring region of the first symbol vector 315. Herein, the first symbol vector 315 can be an initial symbol vector determined by the first scheme 300. However, the initial symbol vector can be determined by other scheme than the first scheme 300. Herein, the neighboring region indicates a set of a particular symbol vector and symbol vectors within a specific distance in the symbol vector region. The symbol vector region G can be defined as $G=S^n$, where S denotes a set of all of symbols corresponding to a modulation order and n denotes a dimension of the symbol vector. The specific distance can indicate the number of neighboring symbols of each symbol of the symbol vector. For example, when S={−3,−1,1,3}, n=3, and the specific distance is 2, the neighboring region of the symbol vector [3,−1,−3] can be defined as shown in Table 1.

TABLE 1

| | | |
|---|---|---|
| 1 | −1 | −3 |
| −1 | −1 | −3 |
| 3 | −3 | −3 |
| 3 | 1 | −3 |
| 3 | −1 | −1 |
| 3 | −1 | 1 |

In Table 1, the column indicates symbol vectors of the neighboring region. That is, the neighboring region can be determined by replacing the symbols of the symbol vector with the symbols corresponding to the specific distance. In the following, the neighboring region can be referred to as a vector neighbor or a tabu list.

After determining the first region 320, the receiving device 120 can search the first region 320 for the second symbol vector 325. In other words, the receiving device 120 can determine the second symbol vector 325 among the symbol vectors of the first region 320. For example, the second symbol vector 325 can have the lowest ML metric size among the symbol vectors of the first region 320. The determined second symbol vector 325 can be regarded as a temporary solution vector. Next, the receiving device 120 can search for the third symbol vector 335 in a second region 330 from the second symbol vector 325 in a similar manner to the search of the second symbol vector 325 from the first symbol vector 315, and the fourth symbol vector 345 in a third region 340 and the fifth symbol vector 355 in a fourth region 350 can be determined in a similar fashion as well. In the second scheme 310, the process from the determination of the particular symbol vector (or from the determination of the initial symbol vector) to the determination of the next symbol vector can be referred to as an iteration.

When the receiving device 120 searches the neighboring region of a particular symbol vector for a next symbol vector having the lowest ML metric size, the same temporary solution vector can be searched repeatedly. For example, after the temporary solution vector is searched in order of 'the first symbol vector 315→the second symbol vector 325→the third symbol vector 335→the fourth symbol vector 345', when the first symbol vector 315 is searched again as the temporary solution vector from the fourth symbol vector 345, the receiving device 120 repeatedly searches only the first symbol vector 315, the second symbol vector 325, the third symbol vector 335, and the fourth symbol vector 345 and cannot search other symbol vector (e.g., the fifth symbol vector 355). To address this problem, the receiving device 120 can generate a list of the repeatedly searched symbol vectors and record an iteration count, that is, a prohibition count so as not to repeatedly search the searched symbol vector. The receiving device 120 can avoid the repeated search of the symbol vector by determining the symbol vector having the lowest ML metric, as the next symbol vector, among the symbol vectors (including symbol vectors having the search prohibition count of zero) with no search prohibition count in the neighboring region of the particular symbol vector. For example, the fifth symbol vector 355, rather than the first symbol vector 315, can be searched from the fourth symbol vector 345. When the iteration count exceeds a predetermined count or the search count of the repeated symbol vector exceeds a predetermined count, the receiving device 120 can finish the algorithm based on the second scheme and determine the final solution vector to the symbol vector having the lowest ML metric size among the searched symbol vectors.

While the symbol vector is searched based on the second scheme 310 in FIG. 3B, the search of the second scheme 310 can be applied to the symbol, rather than the symbol vector. That is, the receiving device 120 can search a one-dimensional symbol space G=S for the symbol based on the second scheme 310 and determine a solution symbol. Herein, the second scheme 310 can be referred to as a symbol vector search or a tabu search.

Since the signal detection of the second scheme 310 iteratively determines the next symbol vector from the initial temporary solution vector, BER performance can greatly vary depending on the initial temporary solution vector and latency for the signal detection can increase.

Figure 4:
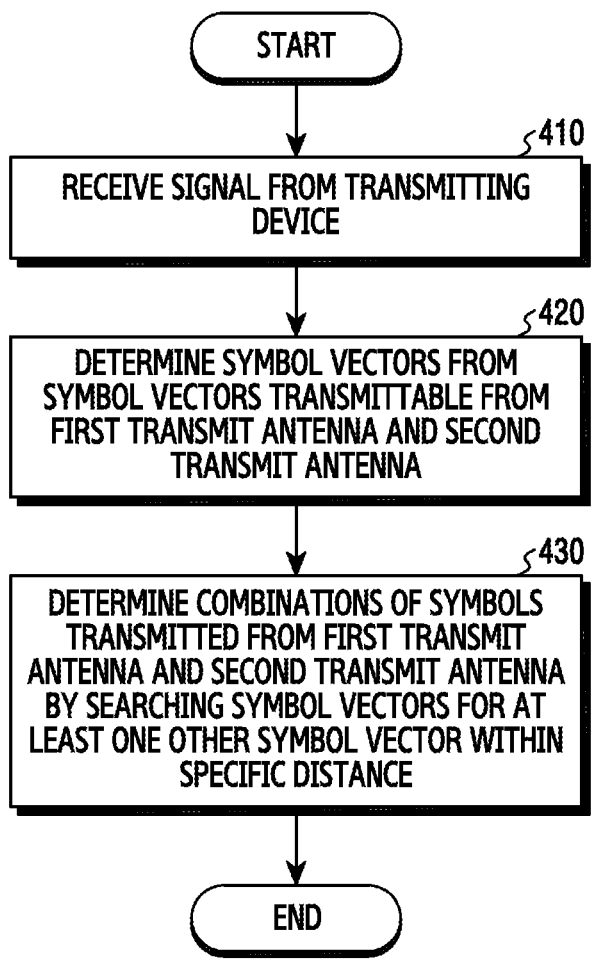
FIG. 4 depicts a method for determining a combination of transmit symbols according to an embodiment of the disclosure.

FIG. 4 is a flowchart of a method for determining a combination of transmit symbols according to an embodiment of the disclosure. Operations of FIG. 4 can be carried out by the receiving device 120.

Referring to FIG. 4, in operation 410, the receiving device 120 receives a signal from the transmitting device 110. According to various embodiments of the disclosure, the transmitting device 110 can include a plurality of transmit antennas, and the receiving device 120 can include the signal transmitted via the multiple transmit antennas. For example, the transmit antennas can include a first transmit antenna and a second transmit antenna. When the receiving device 120 includes a plurality of receive antennas, each receive antenna can receive a signal which combines the signals from the transmit antennas.

In operation 420, the receiving device 120 determines a plurality of symbol vectors from symbol vectors possibly transmitted from the first transmit antenna and the second transmit antenna. Based on the received signal, the receiving device 120 can determine the symbol vectors among the symbol vectors possibly transmitted from the first transmit antenna and the second transmit antenna. For example, the symbol vectors possibly transmitted from the first transmit antenna and the second transmit antenna can be combinations of symbol vectors possibly transmitted from the first transmit antenna and symbol vectors possibly transmitted from the second transmit antenna. Although not depicted, based on the received signal, the receiving device 120 can determine symbols estimated to be transmitted from the first transmit antenna, and the symbol vectors can be determined from the combinations of the symbol vectors estimated to be transmitted from the first transmit antenna and the symbol vectors estimated to be transmitted from the second transmit antenna. For example, determining the symbol vectors estimated to be transmitted from the first transmit antenna can correspond to determining the predetermined number of the symbols in the first step of the first scheme of FIG. 3A, and determining the symbol vectors can correspond to determining the predetermined number of the symbol vectors in the second step of the first scheme of FIG. 3A.

In operation 430, the receiving device 120 determines the combinations of the symbols transmitted from the first transmit antenna and the second transmit antenna by searching the symbol vectors for at least one other symbol vector within a specific distance. The receiving device 120 can search the symbol vectors for at least one other symbol vector within the specific distance from the symbol vectors, and thus determine the combinations of the symbols transmitted from the first transmit antenna and the second transmit antenna. According to various embodiments of the disclosure, searching for at least one other symbol vector in operation 430 can correspond to searching for the next symbol vector in the neighboring region of the particular symbol vector in the second scheme.

As described in FIG. 4, the receiving device 120 according to an embodiment of the disclosure can perform the symbol vector search on the multiple symbol vectors. In other words, the receiving device 120 can search the symbol vectors in parallel and thus achieve higher BER performance than the symbol vector search on the single symbol vector. In addition, the latency for the signal detection can be reduced by lowering the iteration count in each symbol vector search. The method for determining the combination of the transmit symbols in FIG. 4 shall be explained in more detail in FIG. 5.

Figure 5:
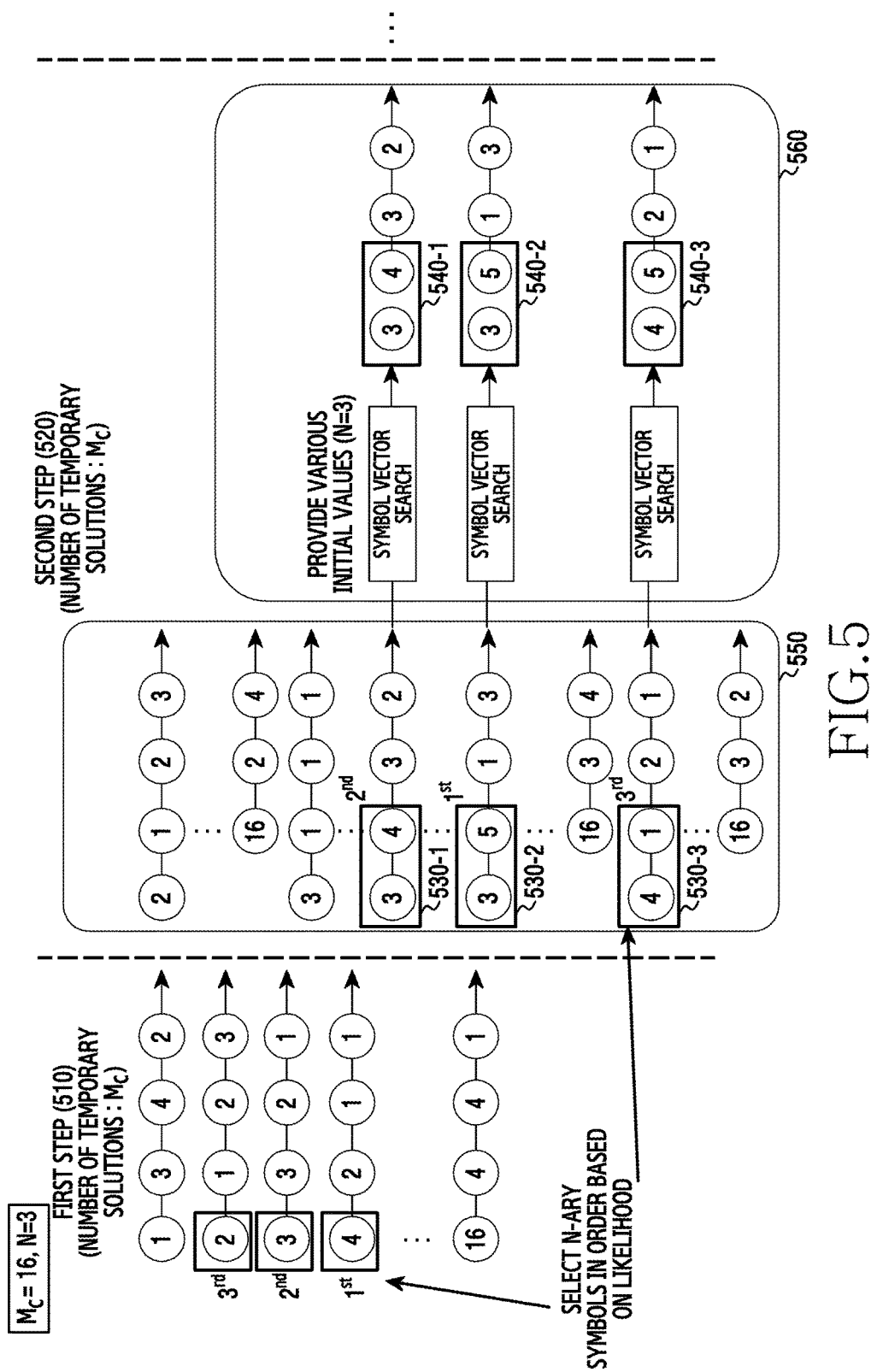
FIG. 5 depicts a method for determining a combination of transmit symbols according to an embodiment of the disclosure.

FIG. 5 depicts a method for determining a combination of transmit symbols according to an embodiment of the disclosure.

Referring to FIG. 5, a circle around a number indicates a symbol of an index corresponding to the number.

The receiving device 120 can select N-ary symbols in order based on likelihood in a first step 510. Herein, N denotes the number of symbols or symbol vectors selected in the first step 510 and a second step 520 respectively. Also, $M_c$ denotes the number of all of symbols corresponding to a modulation order. It is assumed that N=3 and $M_c$=16 in FIG. 5 to ease the understanding. The embodiment of FIG. 5 can be identically applied to various N and M.

The first step 510 can correspond to the first step of the first scheme of FIG. 3A. In other words, the receiving device 120 can determine temporary solution vectors for combinations of symbols possibly transmitted from a first transmit antenna ($M_c$=16-ary symbols in FIG. 5), extract symbols corresponding to the first transmit antenna from N-ary temporary solution vectors (N=3-ary temporary solution vectors in FIG. 5) having the lowest ML metric size, and thus determine symbols estimated to be transmitted from the first transmit antenna. The first step 510 of FIG. 5 determines the symbol 4 in the temporary solution vector having the lowest ML metric size, the symbol 3 in the temporary solution vector having the second lowest ML metric size, and the symbol 2 in the temporary solution vector having the third lowest ML metric size, as the symbols estimated to be transmitted from the first transmit antenna.

The second step 520 can include a first sub-operation 550 and a second sub operation 560. For example, the first sub operation 550 can correspond to the second step of the first scheme of FIG. 3A. In other words, in the first sub operation 550, the receiving device 120 can determine temporary solution vectors for combinations of the symbols (the symbol 2, the system 3, and the symbol 4 in FIG. 5) estimated to be transmitted from the first transmit antenna and symbols (M_16-ary symbols in FIG. 5) possibly transmitted from the second transmit antenna, extract a symbol vector corresponding to the first transmit antenna and the second transmit antennas from N-ary temporary solution vectors (N=3-ary temporary solution vectors in FIG. 5) having the lowest ML metric size, and thus determine the symbol vector estimated to be transmitted from the first transmit antenna and the second transmit antenna. The first sub operation 550 of FIG. 5 determines a symbol vector 530-1 ([3,5]) from the temporary solution vector having the lowest ML metric size, a symbol vector 530-2 ([3,4]) from the temporary solution vector having the second lowest ML metric size, and a symbol vector 530-3 ([4,1]) from the temporary solution vector having the third lowest ML metric size, as the symbol vector estimated to be transmitted from the first transmit antenna and the second transmit antenna.

In the second sub operation 560, the receiving device 120 can determine combinations of the symbols transmitted from the first transmit antenna and the second transmit antenna by individually searching the symbol vectors 530-1, 530-2, and 530-3 determined in the first sub operation 550. For example, the receiving device 120 can determine symbol combinations 540-1 ([3,4]), 540-2 ([3,5]), and 540-3 ([4,5]) of the symbols transmitted from the first transmit antenna and the second transmit antenna by iteratively searching a neighboring region for a next symbol vector, starting from the symbol vectors 530-1, 530-2, and 530-3. Herein, the symbol combination 540-1 can be the result of the symbol vector search starting from the symbol vector 530-1, the symbol combination 540-2 can be the result of the symbol vector search starting from the symbol vector 530-2, and the symbol combination 540-3 can be the result of the symbol vector search starting from the symbol vector 530-3.

While the first step 510 does not conduct the symbol vector search in FIG. 5, the first step 510 can also perform the symbol vector search. That is, the receiving device 120 can determine the symbols transmitted from the first transmit antenna by iteratively searching the symbols of the neighboring region with respect to the symbol 2, the symbol 3, and the symbol 4.

Figure 13:
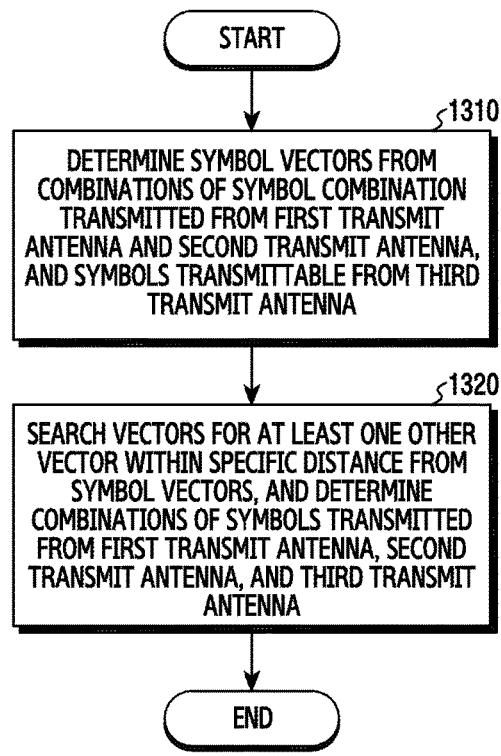
FIG. 13 depicts a method for determining a combination of symbols transmitted from transmit antennas further including an additional transmit antenna according to an embodiment of the disclosure.

While steps after the second step 520 are not depicted in FIG. 5 for the sake of explanations, the receiving device 120 can perform a third step or a next step according to the number of the transmit antennas, which shall be further described in FIG. 13.

In the first step 510 of FIG. 5, the symbols (e.g., the symbol 2, the system 3, and the symbol 4) estimated to be transmitted from the first transmit antenna can be determined from, for example, the N-ary temporary solution vectors (N=3-ary temporary solution vectors in FIG. 5) having the lowest ML metric size. The receiving device 120 can determine the symbols of the first transmit antenna from the N-ary temporary solution vectors having the inconsecutive ML metric size. In other words, the receiving device 120 can determine the symbols estimated to be transmitted from the first transmit antenna from the N-ary temporary solution vectors having the inconsecutive ML metric size, among the temporary solution vectors of the symbols possibly transmitted from the first transmit antenna. Now, FIG. 6A provides a method of the receiving device 120 for determining the symbols or the symbol vectors from the N-ary temporary solution vectors having the inconsecutive ML metric size.

Figure 6A:
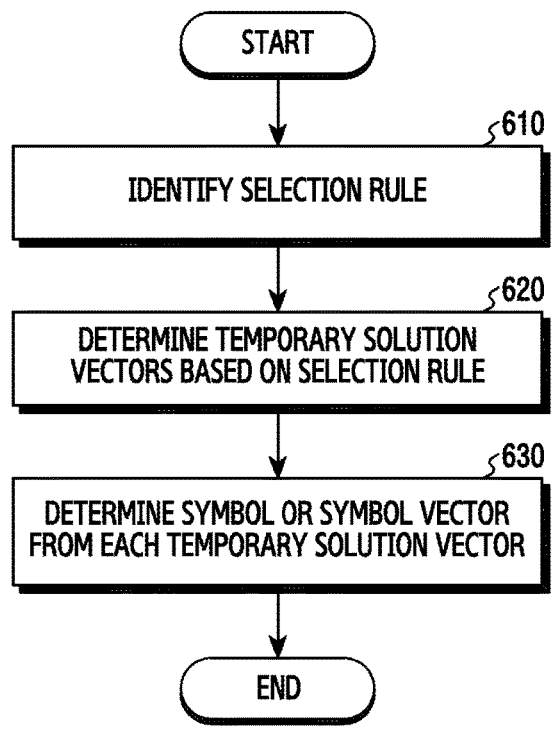
FIG. 6A depicts a method for determining a combination of transmit symbols based on a selection rule according to an embodiment of the t disclosure.

FIG. 6A depicts a method for determining a combination of transmit symbols based on a selection rule according to an embodiment of the disclosure.

Referring to FIG. 6A, in operation 610, the receiving device 120 identifies a selection rule. The selection rule can indicate a rule for selecting a predetermined number of temporary solution vectors from all of temporary solution vectors, in order to determine symbols estimated to be transmitted from one transmit antenna or to determine symbol vectors estimated to be transmitted from multiple transmit antennas. For example, the selection rule can select the predetermined number of temporary solution vectors having the successive ML metric size order. When the selection rule indicates to select three temporary solution vectors having the lowest ML metric size, the selection rule can be expressed as [1 2 3]. For example, the selection rule can select the predetermined number of temporary solution vectors having the inconsecutive ML metric size. When the selection rule indicates to select a temporary solution vector having the lowest ML metric size, a temporary solution vector having the sixth lowest ML metric size, and a temporary solution vector having the tenth lowest ML metric size among all the temporary solution vectors, the selection rule can be expressed as [1 6 10]. The selection rule can be expressed variously, depending on the predetermined number for selecting the temporary solution vectors and/or the ML metric size order. Additionally, the selection rule indicates the ML metric size order by way of example. The selection rule can indicate to select the predetermined number of the temporary solution vectors based on other metric than the ML metric.

According to various embodiments of the disclosure, the selection rule can be determined based on at least one of an input received at the receiving device 120, a modulation and coding scheme (MCS) level, a channel quality between the receiving device 120 and the transmitting device 110, and BER. Hence, the selection rule is not fixed, but can adaptively change based on at least one of the input received at the receiving device 120, the MCS level, the channel quality between the receiving device 120 and the transmitting device 110, and the BER.

In operation 620, the receiving device 120 determines a plurality of temporary solution vectors based on the selection rule. Based on the selection rule, the receiving device 120 can select the predetermined number of the temporary solution vectors among all of possible temporary solution vectors. For example, the receiving device 120 can select the predetermined number of the temporary solution vectors having the successive or inconsecutive ML metric size, based on the selection rule. For example, the receiving device 120 can select the predetermined number of the temporary solution vectors based on other metric than the ML metric size, according to the selection rule.

In operation 630, the receiving device 120 determines a symbol or a symbol vector from each of the temporary solution vectors. For example, when a plurality of temporary solution vectors is determined from temporary solution vectors for the symbols possibly transmitted from the first transmit antenna, the receiving device 120 can determine a symbol estimated to be transmitted from the first transmit antenna from each of the temporary solution vectors. For example, when a plurality of temporary solution vectors is determined from temporary solution vectors for combinations of the symbols of the first transmit antenna and the symbols possibly transmitted from the second transmit antenna, the receiving device 120 can determine symbol vectors estimated to be transmitted from the first transmit antenna and the second transmit antenna, from the temporary solution vectors.

As above, to determine the symbols estimated to be transmitted from one transmit antenna or to determine the symbol vectors estimated to be transmitted from the multiple transmit antennas, the predetermined number of the temporary solution vectors can be selected from all the possible temporary solution vectors. However, the possible temporary solution vectors can be divided into a predetermined number of groups, and the predetermined number of the temporary solution vectors can be determined from the groups respectively. Now, FIG. 6B provides a method of the receiving device 120 for determining the predetermined number of the temporary solution vectors or the symbol vectors from the groups of the temporary solution vectors.

Figure 6B:
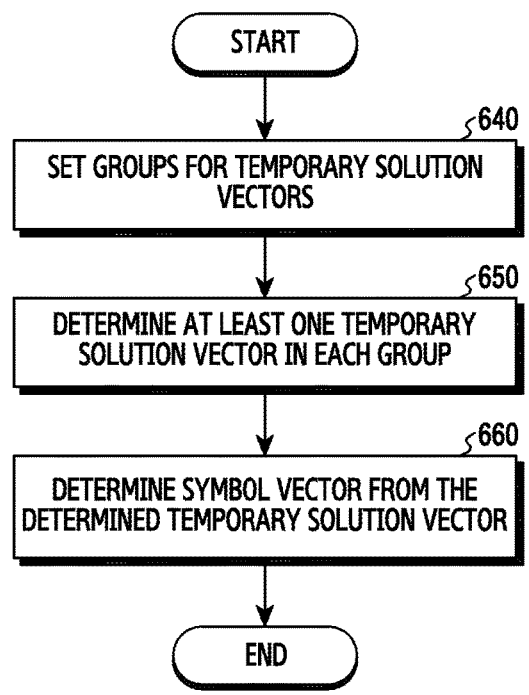
FIG. 6B depicts a method for determining a combination of transmit symbols based on a group according to an embodiment of the disclosure.

FIG. 6B is a flowchart of a method for determining a combination of transmit symbols based on a group according to an embodiment of the disclosure.

Referring to FIG. 6B, in operation 640, the receiving device 120 sets a plurality of groups for temporary solution vectors. According to various embodiments of the disclosure, the receiving device 120 can determine symbols or symbol combinations when one additional transmit antenna is considered in each operation. The receiving device 120 can determine symbols or symbol combinations determined in a previous operation, and symbol combinations possibly transmitted from the additional transmit antenna considered in a current operation, and determine temporary solution vectors for the determined combinations. The groups can include the temporary solution vectors determined from the symbols or the symbol combinations determined in the previous operation. Since the predetermined number of the symbols or the symbol combinations is determined in the previous operation, the groups can be set in a preset number.

In operation 650, the receiving device 120 determines at least one temporary solution vector in each of the groups. For example, the receiving device 120 can determine the temporary solution vector having the lowest ML metric size in each group.

In operation 660, the receiving device 120 determines a symbol vector from the determined temporary solution vector. The receiving device 120 can determine the symbol vector by extracting a symbol vector corresponding to the additional transmit antenna considered in the current operation and transmit antenna(s) considered in the previous operation, from the determined temporary solution vector.

Figure 7:
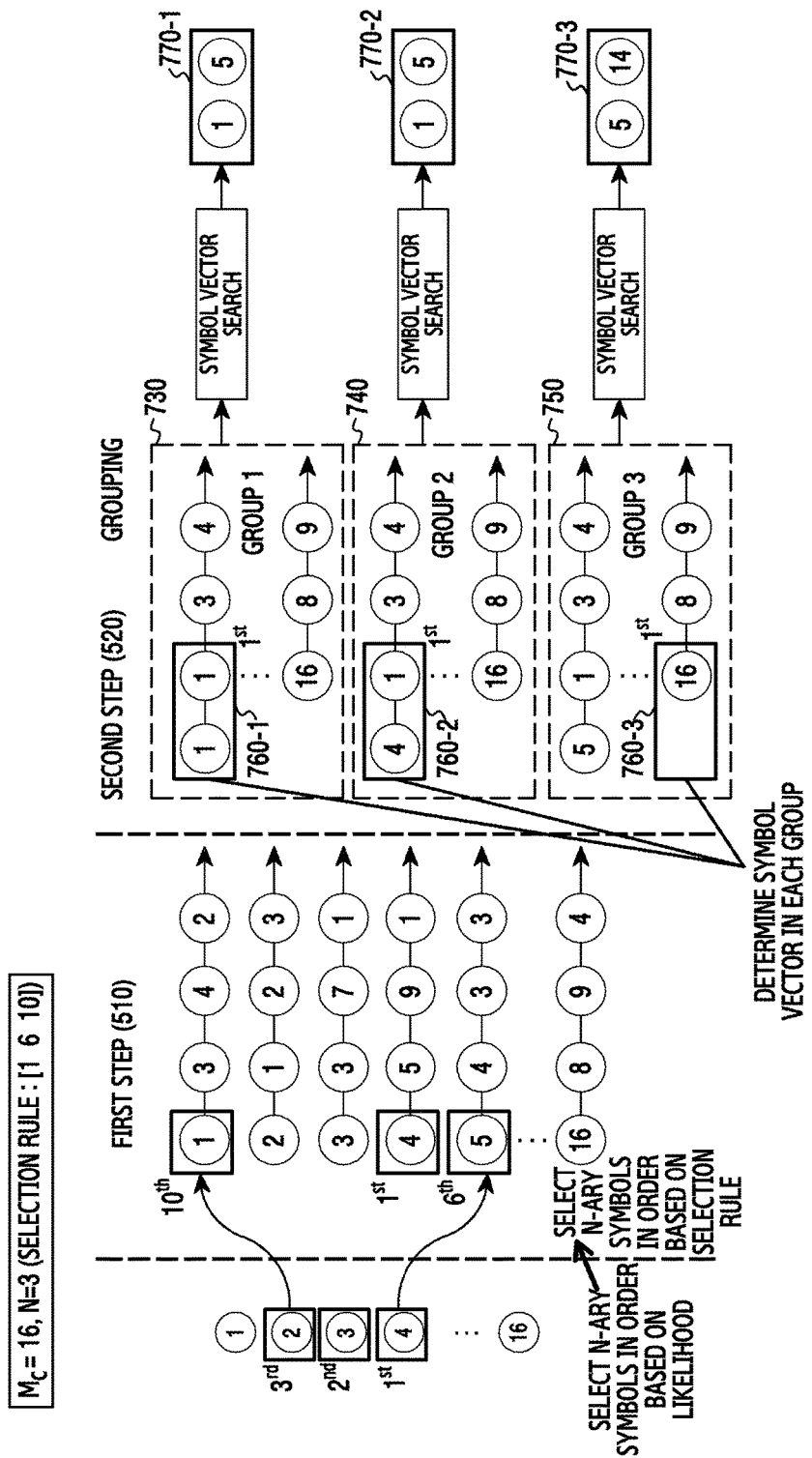
FIG. 7 depicts a method for determining a combination of transmit symbols based on a selection rule and/or a group according to an embodiment of the disclosure.

Now, the methods of FIG. 6A and FIG. 6B shall be described with a specific example in FIG. 7.

FIG. 7 depicts a method for determining a combination of transmit symbols based on a selection rule and/or a group according to an embodiment of the disclosure.

Referring to FIG. 7, the receiving device 120 can determine symbols (symbols 1, 4, and 5) estimated to be transmitted from a first transmit antenna according to a selection rule [1 6 10] in the first step 510 as in FIG. 5.

In the second step 520 as in FIG. 5, the receiving device 120 can divide temporary solution vectors into N-ary groups and determine one temporary solution vector based on the ML metric in each of the N-ary group, instead of determining N-ary temporary solution vectors (N=3-ary temporary solution vectors in FIG. 7) based on the ML metric among the temporary solution vectors. For example, the receiving device 120 can place the temporary solution vectors for the combinations of one (e.g., the symbol 1) of the symbols (the symbols 1, 4, and 5 in FIG. 7) determined in the first step 510 and the symbols possibly transmitted from the second transmit antenna, in a first group 730. For example, the receiving device 120 can place the temporary solution vectors for combinations of another one (e.g., the symbol 4) of the symbols determined in the first step 510 and the symbols possibly transmitted from the second transmit antenna, in a second group 740. Likewise, the receiving device 120 can determine a third group 750 based on the other one (e.g., the symbol 5) of the symbols determined in the first step 510. The receiving device 120 can determine one temporary solution vector having the lowest ML metric size in the first group 730, the second group 740, and the third group 750, and determine symbol vectors 760-1 ([1, 1]), 760-2 ([4,1]), and 760-3 ([5,16]) in the determined temporary solution vectors. Next, the receiving device 120 can individually search the symbol vectors 760-1, 760-2, and 760-3 and thus determine symbol combinations 770-1 ([1,5]), 770-2 ([1,5]), and 770-3 ([5,14]) transmitted from the first transmit antenna and the second transmit antenna.

In FIG. 7, the receiving device 120 can determine the symbol estimated to be transmitted from the first transmit antenna, from the temporary solution vectors having the inconsecutive ML metric size based on the selection rule in the first step 510, determine the symbol vectors 760-1, 760-2, and 760-3 per group 730, 740, and 750 in the second step 520, and thus reduce a possibility that the symbol combinations 770-1, 770-2, and 770-3 finally determined by the symbol vector search in the second step 520 are repeated. While the symbols are determined based on the selection rule in the first step 510 and the symbol vectors are determined per group in the second step 520 in FIG. 7, various modifications can be made. For example, the receiving device 120 can determine the symbols based on the selection rule in the first step 510 and determine the symbol vectors in the N-ary temporary solution vectors among all the temporary solution vectors including the temporary solution vectors of the groups, rather than determining the symbol vectors per group, in the second step 520. For example, the receiving device 120 can determine the estimated symbols of the first transmit antenna from the N-ary temporary solution vectors having the lowest ML metric size in the first step 510, and determine the symbol vectors per group in the second step 520. Thus, the possibility that the combination of the symbols finally determined by the symbol vector search is repeated can decrease.

Nevertheless, when the symbol vectors are searched individually, the combination of the symbols determined as the result of the symbol vector search can be repeated. When the symbol combination is repeated, the individually symbol vector search cannot be conducted in a next step and thus the BER performance can be lowered. Hence, the receiving device 120 needs to be able to avoid the repeated symbol combination in the symbol vector search, or to process the repeated symbol combination. Now, a method for processing the repeated symbol combination as the result of the symbol vector search shall be described in FIG. 8.

Figure 8:
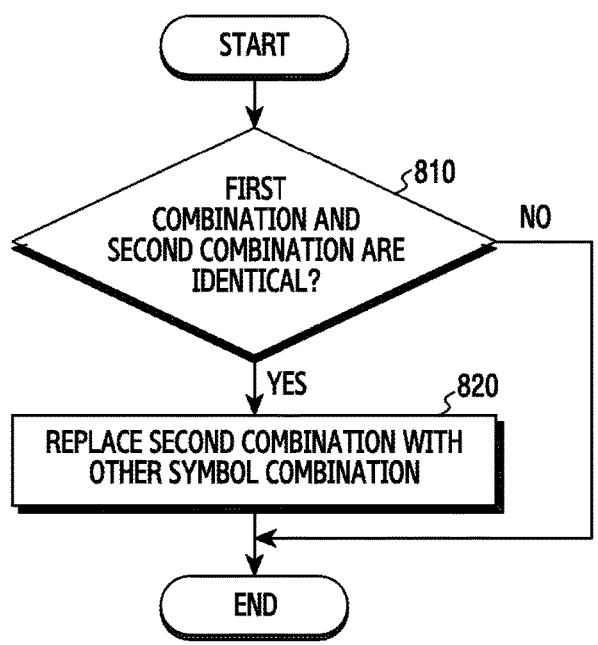
FIG. 8 depicts a method for processing a combination of identical symbols, as a result of symbol vector search according to an embodiment of the disclosure.

FIG. 8 is a flowchart of a method for processing a combination of the same symbols, as a result of symbol vector search according to an embodiment of the disclosure.

Referring to FIG. 8, in operation 810, the receiving device 120 determines whether a first combination and a second combination are identical. Herein, the first combination and the second combination can be the symbol combinations determined by the symbol vector search from different symbol vectors. When symbols corresponding to the same transmit antenna are identical in the first combination and the second combination, the receiving device 120 can determine that the first combination and the second combination are identical.

When the first combination and the second combination are identical, the receiving device 120 replaces the second combination with other symbol combination in operation 820. Alternatively, the receiving device 120 can replace the first combination with other symbol combination. Herein, the other symbol combination can be different from an initial symbol vector of the symbol vector search for determining the first combination and the second combination. For example, when the initial symbol vector of the symbol vector search for determining the first combination and the second combination is determined from temporary solution vectors having the lowest ML metric size among all of temporary solution vectors, the other symbol combination can be determined from a temporary solution vector having the second lowest ML metric size. For example, when the initial symbol vector of the symbol vector search for determining the first combination and the second combination is determined from a temporary solution vector having the lowest ML metric size in a temporary solution vector group, the other symbol combination can be determined from a temporary solution vector having the second lowest ML metric size in the corresponding group. The temporary solution vector from which the other symbol combination is determined is determined based on the ML metric size in the whole temporary solution vectors or the group of the temporary solution vectors by way of example, and it can be determined on other basis. For example, the temporary solution vector from which the other symbol combination is determined can be determined based on the selection rule from the whole temporary solution vectors or the group of the temporary solution vectors.

When the first combination and the second combination are different, the first combination and the second combination are determined adequately and thus the receiving device 120 finishes this process.

Figure 9:
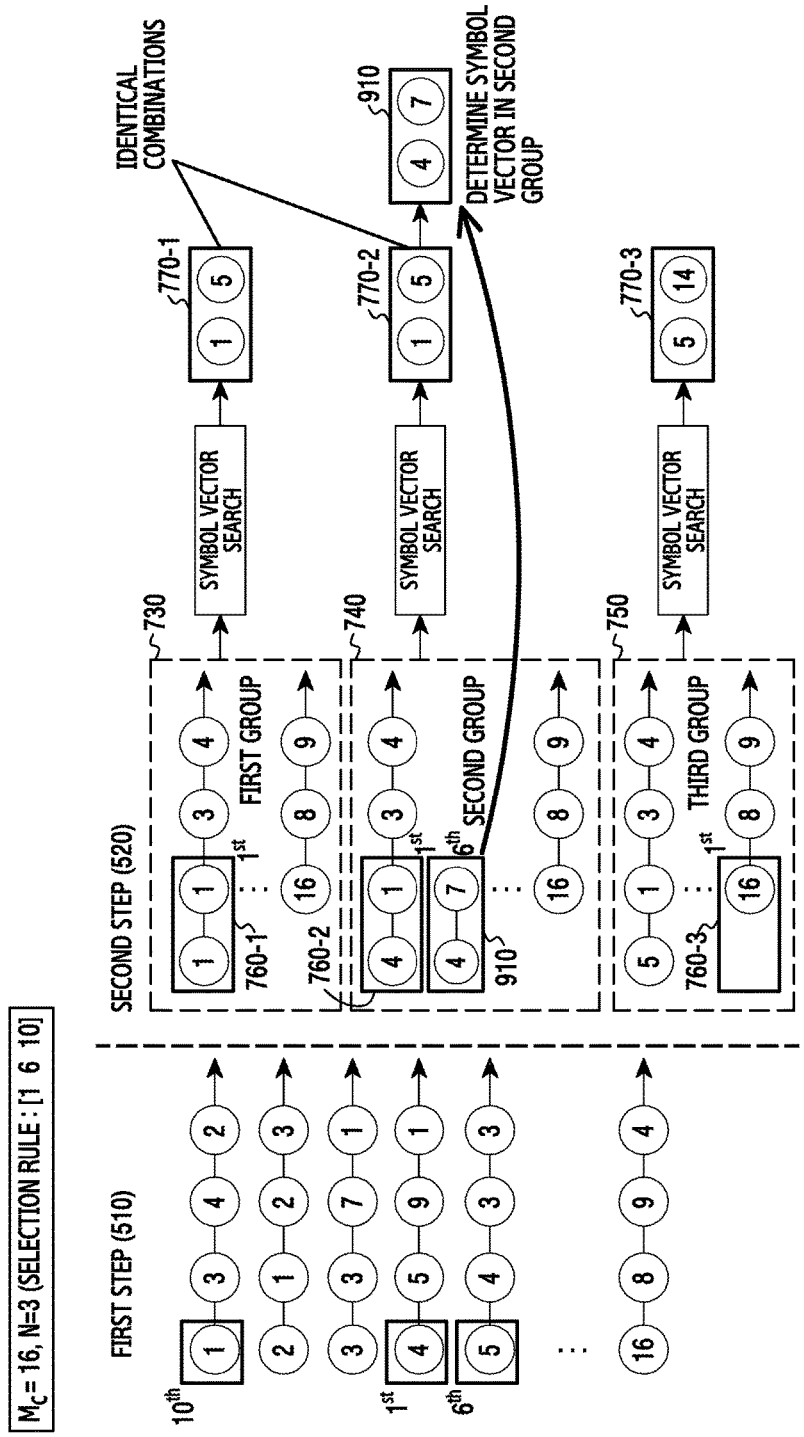
FIG. 9 depicts a method for processing a combination of identical symbols, as a result of symbol vector search according to an embodiment of the disclosure.

Now, the method of FIG. 8 is explained with a specific example in FIG. 9.

FIG. 9 depicts a method for processing a combination of the same symbols, as a result of symbol vector search according to an embodiment of the disclosure.

Referring to FIG. 9, the first step 510 and the second step 520 determine symbol combinations 770-1, 770-2, and 770-3 as in FIG. 7. In FIG. 9, the symbol combination 770-1 ([1,5]) determined by the symbol vector search from the symbol vector 760-1 of the first group 730 is identical with the symbol combination 770-2 ([1,5]) determined by the symbol vector search from the symbol vector 760-2 of the second group 740. That is, the receiving device 120 can determine that the symbol combination 770-1 and the symbol combination 770-2 determined by the symbol vector search are identical. In this case, the receiving device 120 can replace one of the symbol combination 770-1 and the symbol combination 770-2 with other symbol combination. For example, the symbol combination 770-2 can be replaced by a symbol combination 910 as shown in FIG. 9. Referring to FIG. 9, the symbol combination 910 can be determined from one of temporary solution vectors of the second group 770-2. In other words, since the replaced symbol combination 770-2 is determined from the symbol vector 760-2 of the temporary solution vector of the second group 740, the replacing symbol combination 910 can be determined from other temporary solution vector of the second group 740.

Herein, the symbol combination 910 can be determined from the temporary solution vector having the sixth lowest ML metric size, according to, but not limited to, a selection rule (the selection rule [1 6 10] in FIG. 9) among the temporary solution vectors of the second group 740. The symbol combination 910 can be determined from one of the temporary solution vectors of the second group 740, based on the ML metric size, regardless of the selection rule. When the groups 730, 740, and 750 are not set in the second step 520, the symbol combination 910 can be determined from one of the whole temporary solution vectors including all the temporary solution vectors of the groups. For example, the symbol combination 910 can be determined from one of the whole temporary solution vectors from which the symbol vectors 760-1, 760-2, and 760-3 are not determined, based on the selection rule or the ML metric size.

While the symbols are determined based on the selection rule in the first step 510 and the symbol vectors are determined per group in the second step 520 in FIG. 9, various modifications can be made. For example, the receiving device 120 can determine the symbols based on the selection rule in the first step 510, and determine the symbol vectors from the N-ary temporary solution vectors of the whole temporary solution vectors including the temporary solution vectors of the groups in the second step 520, rather than determining the symbol vectors per group. For example, the receiving device 120 can determine the estimated symbols of the first transmit antenna from the N-ary temporary solution vectors having the lowest ML metric size in the first step 510, and determine the symbol vectors per group in the second step 520. For example, as in FIG. 5, the receiving device 120 can determine the symbols from the N-ary temporary solution vectors having the lowest ML metric size in the first step 510 and determine the symbol vectors in the N-ary temporary solution vectors of the whole temporary solution vectors including the temporary solution vectors of the groups in the second step 520.

The method for processing the repeated symbol combination as the result of the symbol vector search has been described in FIG. 8 and FIG. 9. Now, a method of the receiving device 120 for avoiding the repeated symbol combination in the symbol vector search is explained in FIGS. 10A and 10B.

Figure 10A:
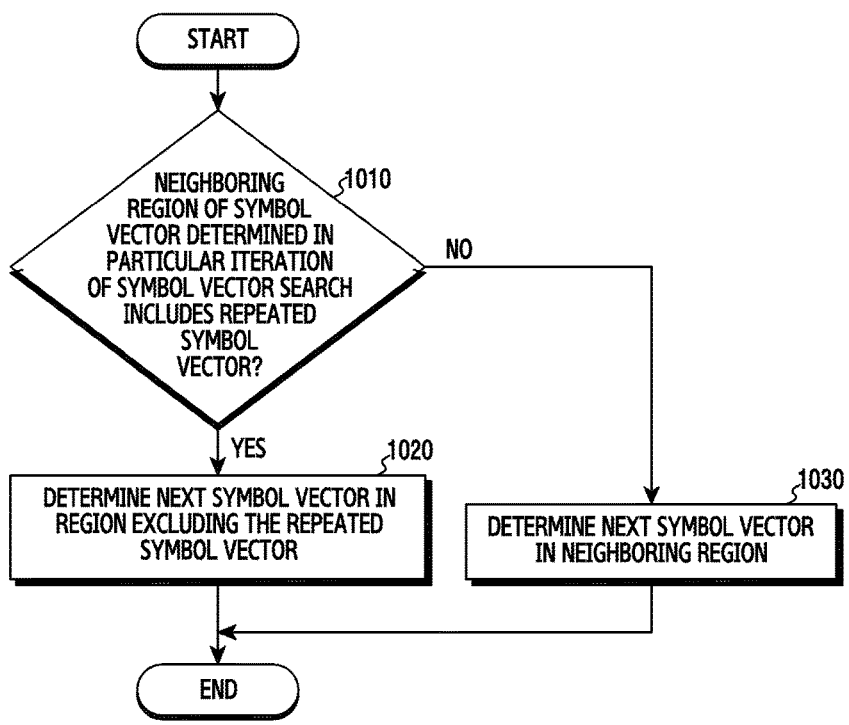
FIG. 10A depicts a first flowchart of a method for avoiding a combination of identical symbols as a result of symbol vector search according to an embodiment of the disclosure.

FIG. 10A is a first flowchart of a method for avoiding a combination of the same symbols, as a result of symbol vector search according to an embodiment of the disclosure.

Referring to FIG. 10A, in operation 1010, the receiving device 120 determines whether a neighboring region of a symbol vector determined in a particular iteration of the symbol vector search includes a repeated symbol vector. The repeated symbol vector can indicate a symbol vector determined in the particular iteration of the symbol vector search, starting from other symbol vector. That is, when the neighboring region of the symbol vector determined in the particular iteration of the symbol vector search starting from the particular symbol vector, includes the symbol vector determined in the particular iteration of the symbol vector search starting from other symbol vector, the symbol vector determined from the other symbol vector can be referred to as the repeated symbol vector.

When the neighboring region of the symbol vector determined in the particular iteration of the symbol vector search includes the repeated symbol vector, the receiving device 120 determines a next symbol vector in the region excluding the repeated symbol vector, in operation 1020. Hence, the next symbol vector can be determined to other symbol than the repeated symbol vector, and the receiving device 120 can prevent the repeated symbol vector search. In conclusion, the receiving device 120 can avoid the combination of the same symbols, as the result of the individual symbol vector searches.

When the neighboring region of the symbol vector determined in the particular iteration of the symbol vector search does not include the repeated symbol vector, the receiving device 120 determines a next symbol vector in the neighboring region, in operation 1030.

Figure 10B:
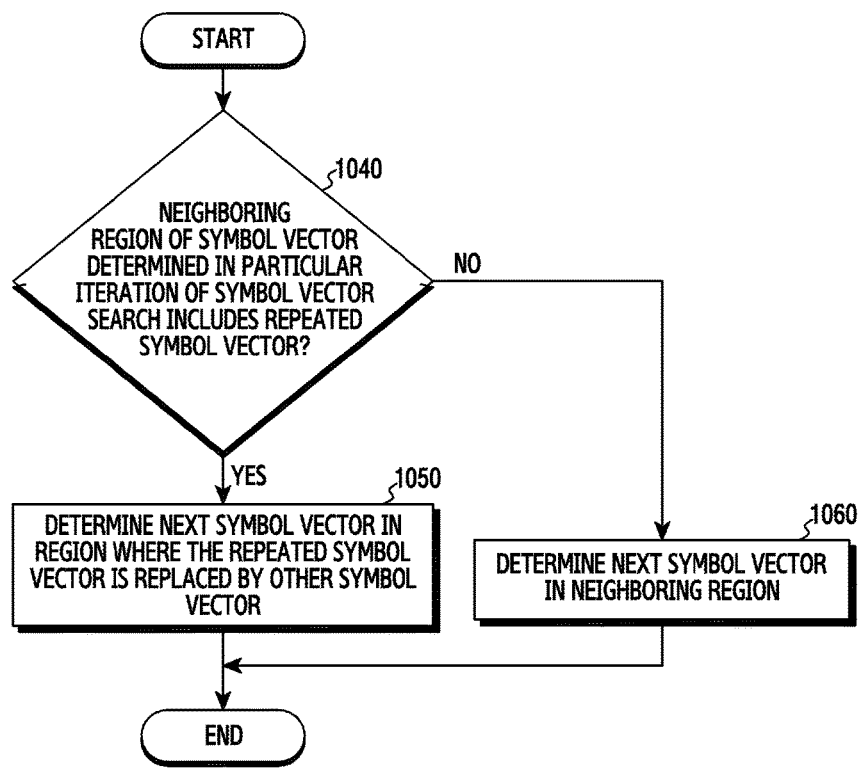
FIG. 10B depicts a second flowchart of a method for avoiding a combination of identical symbols as a result of symbol vector search according to an embodiment of the disclosure.

FIG. 10B is a second flowchart of a method for preventing a combination of the same symbols as a result of symbol vector search according to an embodiment of the disclosure.

Referring to FIG. 10B, in operation 1040, the receiving device 120 determines whether a neighboring region of a symbol vector determined in a particular iteration of the symbol vector search includes a repeated symbol vector. Operation 1040 can be identical to operation 1010.

When the neighboring region of the symbol vector determined in the particular iteration of the symbol vector search includes the repeated symbol vector, the receiving device 120 determines a next symbol vector in a region where the repeated symbol vector is replaced by other symbol vector, in operation 1050. Thus, the next symbol vector can be determined to other symbol than the repeated symbol vector, or to the replaced symbol vector in the neighboring region. The replaced symbol vector, which is not included in the neighboring region, can exceed a distance corresponding to the neighboring region. Namely, the next symbol vector for a particular iteration can be determined to the symbol vector which exceeds a given distance from the symbol vector determined in the particular iteration. Unlike operation 1020, operation 1050 performs the symbol vector search in the region where the repeated symbol vector is replaced by the other symbol vector. Accordingly, candidate symbol vectors for determining the next symbol vector can be maintained in the same number. By determining the next symbol vector in the region where the repeated symbol vector is replaced by the other symbol vector, the receiving device 120 can prevent the repeated symbol vector search. As a result, the receiving device 120 can avoid the combination of the same symbol vectors, as the result of the individual symbol vector searches.

When the neighboring region of the symbol vector determined in the particular iteration of the symbol vector search does not include the repeated symbol vector, the receiving device 120 determines a next symbol vector in the neighboring region, in operation 1060.

Figure 11:
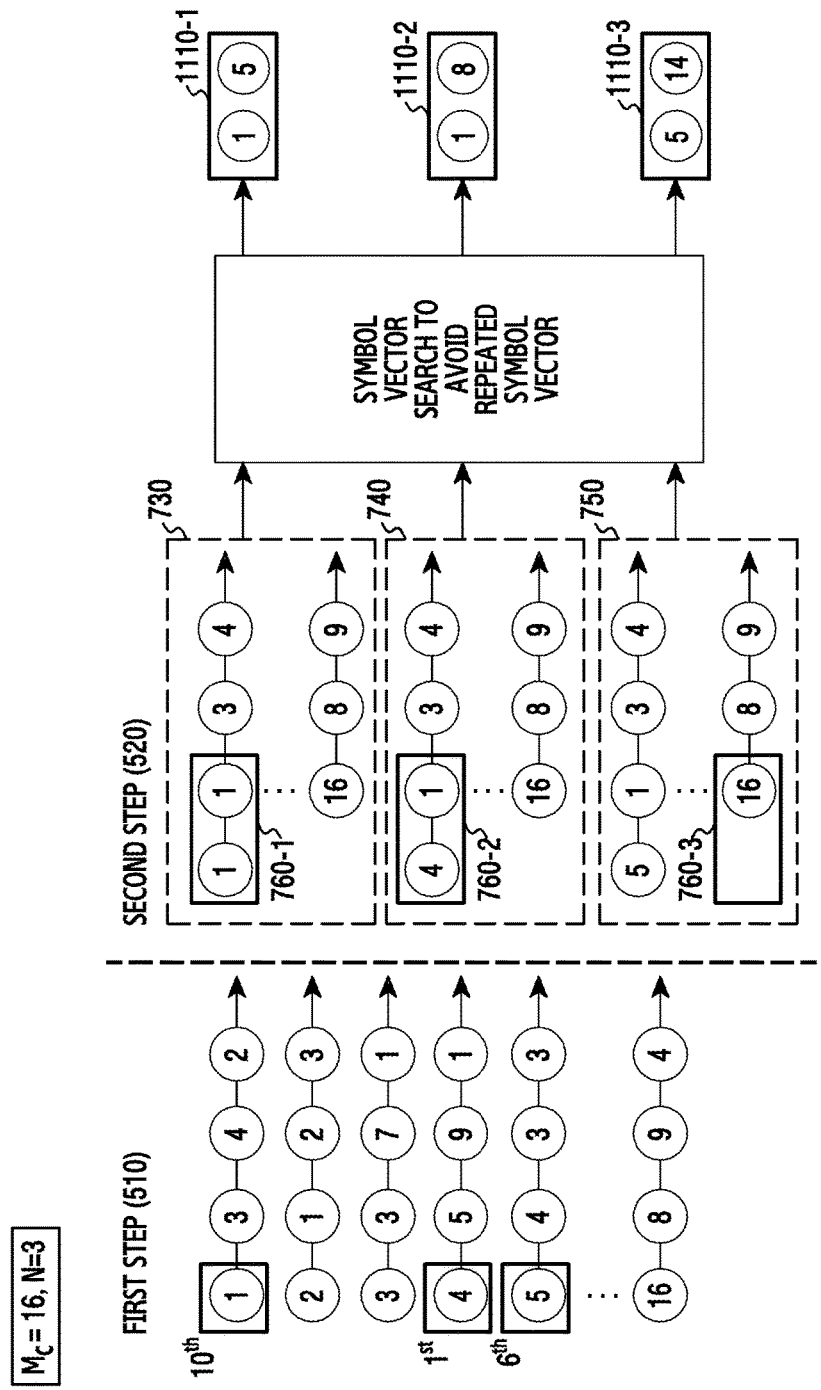
FIG. 11 depicts a method for avoiding a combination of identical symbols as a result of symbol vector search according to an embodiment of the disclosure.

Now, the methods of FIG. 10A and FIG. 10B shall be described with a specific example in FIG. 11.

FIG. 11 depicts a method for preventing a combination of the same symbols as a result of symbol vector search according to an embodiment of the disclosure. The first step 510 and the second step 520 of FIG. 11 can determine symbol combinations 1110-1, 1110-2 and 1110-3 in the same fashion as in FIG. 7.

Referring to FIG. 11, the receiving device 120 can perform symbol vector search on the symbol vectors 760-1, 760-2, and 760-3. For example, the receiving device 120 can determine a neighboring region of the symbol vector 760-1 in the symbol vector search of the symbol vector 760-1, and determine, as a next symbol vector, the symbol vector having the lowest ML metric, among symbol vectors having the lowest ML metric size in the neighboring region or symbol vectors (including symbol vector having a search prohibition count of zero) of which the search prohibition count is not set (one iteration). The receiving device 120 can apply the same iteration to the next symbol vector determined, and continue the iteration until an iteration count exceeds a predetermined count or a search count of the repeated symbol vector exceeds a predetermined count. The receiving device 120 can determine a symbol vector determined in the last iteration, as a combination of final symbols of the symbol vector search. With respect to the symbol vectors 760-2 and 760-3, the receiving device 120 can determine a symbol combination in the same fashion as mentioned above.

Figure 12A:
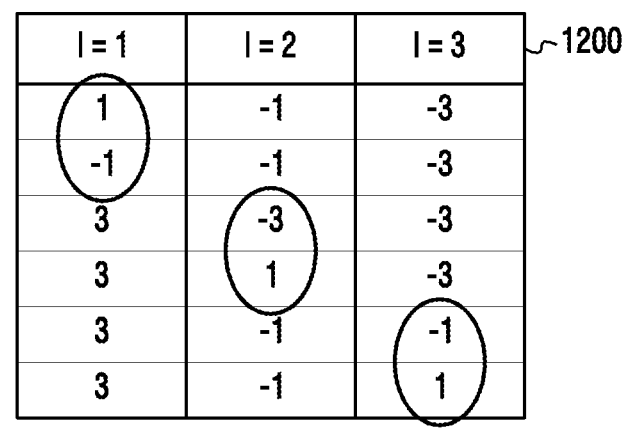
Figure 12B:
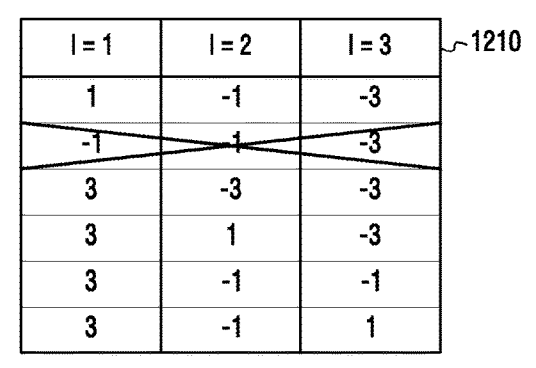

FIGS. 12A, 12B, and 12C depict a table for symbol vector search according to various embodiments of the disclosure.

Referring to FIGS. 12A, 12B, and 12C, when a set of all symbols corresponding to a modulation order is S={−3, −1,1,3}, the neighboring region of the symbol vector [3,−1,−3] determined in a particular iteration of the symbol vector search starting from the symbol vector 760-1 can be defined as shown in Table 1200 of FIG. 12A. In Table 1200, rows except for a first row indicate symbol vectors of the neighboring region. In FIG. 12A, the neighboring region is defined as a region within a distance of 2 from the symbol vector [3,−1,−3]. Hence, the neighboring region can include symbol vectors (the second row and the third row of Table 1200) where the first component symbol 3 of the symbol vector [3,−1,−3] is replaced by two neighboring symbols 1 and −1 of the symbol 3, symbol vectors (the fourth row and the fifth row of Table 1200) where the second component symbol −1 is replaced by two neighboring symbols −3 and 1 of the symbol −1, and symbol vectors (the sixth row and the seventh row of Table 1200) where the third component symbol −3 is replaced by two neighboring symbols −1 and 1 of the symbol −3.

According to various embodiments of the disclosure, the receiving device 120 can individually search the symbol vectors 760-1, 760-2, and 760-3. In this case, the neighboring region (e.g., Table 1200) of the symbol vector determined in a particular iteration of the symbol vector search starting from a particular symbol vector (e.g., the symbol vector 760-1) can include a symbol vector determined in a particular iteration of the symbol vector search starting from other symbol vector (e.g., the symbol vector 760-2 or the symbol vector 760-3). Hence, the symbol vector search can be conducted on the repeated symbol vector, and results of the symbol vector search starting from different symbol vectors can be determined as the combination of the same symbols.

According to various embodiments of the disclosure, to avoid the combination of the repeated symbols in the symbol vector search, the receiving device 120 can determine a next symbol vector in a region excluding the symbol vector determined in a particular iteration of the symbol vector search starting from other symbol vector (e.g., the symbol vector 760-2 or the symbol vector 760-3), in a neighboring region (e.g., Table 1200) of a symbol vector (e.g., the symbol vector [3, −1,−3]) determined in a particular iteration of the symbol vector search starting from a particular symbol vector (e.g., the symbol vector 760-1). Table 1210 of FIG. 12B shows a region excluding the symbol vector (e.g., the symbol vector [−1,1,−3]) determined in the particular iteration of the symbol vector search starting from the other symbol vector (e.g., the symbol vector 760-2 or the symbol vector 760-3) of Table 1200. By determining the next symbol vector in the region of Table 1210, the receiving device 120 can block the symbol vector (e.g., the symbol vector [−1,1,−3]) determined in the particular iteration of the symbol vector search starting from the other symbol vector, from being determined as the next symbol vector.

According to various embodiments of the disclosure, to avoid the combination of the repeated symbols in the symbol vector search, the receiving device 120 can determine a next symbol vector in a region where the symbol vector determined in a particular iteration of the symbol vector search starting from other symbol vector (e.g., the symbol vector 760-2 or the symbol vector 760-3) is replaced, in a neighboring region (e.g., Table 1200) of a symbol vector (e.g., the symbol vector [3,−1,−3]) determined in a particular iteration of the symbol vector search starting from a particular symbol vector (e.g., the symbol vector 760-1). Table 1220 of FIG. 12C shows a region where the symbol vector (e.g., the symbol vector [−1,1,−3]) determined in the particular iteration of the symbol vector search starting from the other symbol vector (e.g., the symbol vector 760-2 or the symbol vector 760-3) of Table 1200 is replaced. Herein, a distance between the replaced symbol vector [−3,31 1, −3] and the symbol vector [3,−1,−3] for determining the neighboring region of Table 1200 exceeds 2. That is, the component symbol 3 of the symbol vector [3,−1,−3] has two neighboring symbols 1 and −1, the symbol vector [−3, −1, −3] replacing the component symbol 3 of the symbol vector [3,−1,−3] with the symbol −3 exceeds the distance 2 from the symbol vector [3,−1,−3]. Thus, when the symbol vector is replaced in the neighboring region, the replaced symbol vector can exceed the distance corresponding to a given region. By replacing the symbol vector, candidate symbol vectors (e.g., the symbol vectors of Table 1220) for determining the next symbol vector can maintain the same number. Also, by determining the next symbol vector in the region of Table 1220, the receiving device 120 can prevent the symbol vector (e.g., the symbol vector [−1,1, −3]) determined in the particular iteration of the symbol vector search starting from other symbol vector, from being determined as the next symbol vector. Further, the receiving device 120 can determine the symbol vector (e.g., the symbol vector [−3, −1, −3]) exceeding the distance corresponding to the neighboring region, as the next symbol vector.

As stated above, the receiving device 120 can perform the symbol vector search in the set of the symbol vectors which exclude or replace the repeated symbol vector in the neighboring region, and thus avoid the repeated combination of the finally determined symbols. In FIG. 11, as the result of the symbol vector search on the symbol vectors 760-1, 760-2, and 760-3 to avoid the repeated symbol vector, a symbol combination 1110-1 ([1,5]), a symbol combination 1110-2 ([1,8]), and a symbol combination 1110-3 ([5,14]) are not repeated eventually.

While the first step 510 determines the symbols based on the selection rule and the second step 520 determines the symbol vectors per group in FIG. 11, various modifications can be made. For example, the receiving device 120 can determine the symbols based on the selection rule in the first step 510, and determine the symbol vectors in the N-ary temporary solution vectors among all the temporary solution vectors including the temporary solution vectors of the groups, rather than determining the symbol vectors per group, in the second step 520. For example, the receiving device 120 can determine the estimated symbols of the first transmit antenna from the N-ary temporary solution vectors having the lowest ML metric size in the first step 510, and determine the symbol vectors per group in the second step 520. For example, as in FIG. 5, the receiving device 120 can determine the symbols from the N-ary temporary solution vectors having the lowest ML metric size in the first step 510, and determine the symbol vectors from the N-ary temporary solution vectors among all the temporary solution vectors including the temporary solution vectors of the groups, in the second step 520.

In FIG. 4 through FIG. 12, the combinations of the symbols transmitted from the two (the first transmit antenna and the second transmit antenna) of the multiple transmit antennas of the transmitting device 110 are determined. However, the receiving device 120 can determine a symbol combination with respect to the other transmit antenna. The following explanations describe operations for determining symbol combinations from the transmit antennas further including a third transmit antenna, after the symbol combinations transmitted from the first transmit antenna and the second transmit antenna are determined.

FIG. 13 is a flowchart of a method for determining a combination of transmit symbols from transmit antennas further including an additional transmit antenna according to an embodiment of the disclosure. Operations of FIG. 13 can be carried out after the receiving device 120 determines the symbol combination transmitted from the first transmit antenna and the second transmit antenna through the symbol vector search.

Referring to FIG. 13, in operation 1310, the receiving device 120 determines symbol vectors from combinations of the symbol combination transmitted from the first transmit antenna and the second transmit antenna and symbols possibly transmitted from the third transmit antenna. For example, when the symbol combination transmitted from the first transmit antenna and the second transmit antenna is $[x_{1,1}, x_{2,5}]$ and the symbols possibly transmitted from the third transmit antenna is $x_{3,1}, x_{3,2}$, L, $x_{3,16}$ (modulation order: 4), the combinations of the symbol combination transmitted from the first transmit antenna and the second transmit antenna and the symbols possibly transmitted from the third transmit antenna can include $[x_{1,1}, x_{2,5}, x_{3,1}]$, $[x_{1,1}, x_{2,5}, x_{3,2}]$, . . . , $[x_{1,1}, x_{2,5}, x_{3,16}]$. The receiving device 120 can also determine combinations of other symbol combination from the first transmit antenna and the second transmit antenna, which are determined by the symbol vector search, and the symbols possibly transmitted from the third transmit antenna. For example, with three symbol combinations from the first transmit antenna and the second transmit antenna, the combinations of the symbol combinations from the first transmit antenna and the second transmit antenna and the symbols possibly transmitted from the third transmit antenna can be 3×16=48. The receiving device 120 can determine a temporary solution vector for each of the combinations. The temporary solution vector can be determined by estimating the symbols transmitted from other transmit antenna, on the premise that the combinations are transmitted from the corresponding transmit antennas. For example, the temporary solution vector can be determined based on MMSE-OSIC. The receiving device 120 can determine N-ary temporary solution vectors from the temporary solution vectors based on an ML metric size and/or a selection rule. For example, the N-ary temporary solution vectors can be determined in an ascending order of the ML metric size, or temporary solution vectors corresponding to the ML metric size of a particular order can be determined based on the selection rule. The receiving device 120 can extract symbol vectors corresponding to the first transmit antenna, the second transmit antenna, and the third transmit antenna from the determined N-ary temporary solution vectors, and thus determine symbol vectors estimated to be transmitted from the first transmit antenna, the second transmit antenna, and the third transmit antenna. The symbol vectors estimated to be transmitted from the first transmit antenna, the second transmit antenna, and the third transmit antenna can be the symbol vectors determined in operation 1310. That is, the symbol vectors determined in operation 1310 include the symbol component for not only the first transmit antenna and the second transmit antenna but also the third transmit antenna, and accordingly their dimension can be greater than the symbol vectors determined in operation 420 of FIG. 4.

In operation 1320, the receiving device 120 searches the symbol vectors for at least one other vector within a specific distance from the symbol vectors, and thus determines combinations of symbols transmitted from the first transmit antenna, the second transmit antenna, and the third transmit antenna. Namely, the receiving device 120 can determine the combinations of the symbols transmitted from the first transmit antenna, the second transmit antenna, and the third transmit antenna by individually searching the symbol vectors. Herein, the symbol vector search of operation 1320 can be conducted on the symbol vector of a higher dimension than the symbol vector search of operation 430.

While the combinations of the symbols transmitted from three (the first transmit antenna, the second transmit antenna, and the third transmit antenna) of the multiple transmit antennas of the transmitting device 110 are determined in FIG. 13, the receiving device 120 can sequentially determine symbol combinations of other transmit antennas in a similar manner to FIG. 13. In this case, as the number of the transmit antennas considered in the symbol vector search increases, the symbol vector search can be performed on the symbol vector of a higher dimension.

The methods according to the embodiments described in the claims or the specification of the disclosure can be implemented in software, hardware, or a combination of hardware and software.

As for the software, a computer-readable storage medium storing one or more programs (software modules) can be provided. One or more programs stored in the computer-readable storage medium can be configured for execution by one or more processors of an electronic device. One or more programs can include instructions for controlling the electronic device to execute the methods according to the embodiments described in the claims or the specification of the disclosure.

Such a program (software module, software) can be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program can be stored to a memory combining part or all of those recording media. A plurality of memories may be equipped.

The program can be stored in an attachable storage device accessible via a communication network such as Internet, Intranet, local area network (LAN), wide LAN (WLAN), or storage area network (SAN), or a communication network by combining these networks. The storage device can access the electronic device through an external port. A separate storage device may access the present device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

The method and the apparatus according to various embodiments of the disclosure can improve the BER performance and reduce the complexity and the latency, using the individual symbol search and detection.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a reception device in a wireless communication system, the method comprising:
   receiving a signal that is transmitted through a plurality of transmission antennas of a transmission device, wherein the plurality of transmission antennas comprise a first transmission antenna and a second transmission antenna;
   obtaining a candidate symbol vector for the first transmission antenna and the second transmission antenna by applying an interference cancellation on a candidate symbol for the first transmission antenna and each possible symbol for the second transmission antenna from the received signal;
   obtaining another candidate symbol vector for the first transmission antenna and the second transmission antenna among symbol vectors within a preset distance from the candidate symbol vector based on a maximum likelihood (ML) metric for the symbol vectors; and
   obtaining a symbol vector for the first transmission antenna and the second transmission antenna based on the another candidate symbol vector.

2. The method of claim 1, further comprising:
   obtaining candidate symbols for the first transmission antenna comprising the candidate symbol by applying an interference cancellation on each possible symbol for the first transmission antenna from the received signal.

3. The method of claim 2, wherein the candidate symbols are identified from vectors having an inconsecutive likelihood size order, among temporary solution vectors comprising symbols possibly transmitted from the first transmission antenna.

4. The method of claim 2, wherein the candidate symbols are identified based on at least one of an input received at the reception device, a modulation and coding scheme (MCS) level, a channel quality between the reception device and the transmission device, or a bit error rate (BER).

5. The method of claim 2, further comprising:
   identifying a first combination of symbols transmitted from the first transmission antenna and the second transmission antenna by searching for at least one other symbol vector within a preset distance from a first symbol vector; and
   identifying a second combination of symbols transmitted from the first transmission antenna and the second transmission antenna by searching for at least one other symbol vector within a preset distance from a second symbol vector,
   wherein the first symbol vector is determined from combinations of one of the candidate symbols and symbols possibly transmitted from the second transmission antenna, and wherein the second symbol vector is determined from combinations of another one of the candidate symbols and symbols possibly transmitted from the second transmission antenna.

6. The method of claim 5, further comprising, if the first combination and the second combination are identical, replacing the second combination with a symbol combination which is different from the second combination among the combinations of the another one of the candidate symbols and symbols possibly transmitted from the second transmission antenna.

7. The method of claim 5, wherein the at least one other symbol vector within the preset distance from the second symbol vector is different from the at least one other symbol vector within the preset distance from the first symbol vector.

8. The method of claim 5, wherein the second combination is further determined by searching for at least one other symbol vector which exceeds the preset distance from the second symbol vector.

9. The method of claim 1, wherein the plurality of transmission antennas further comprise a third transmission antenna, further comprising:
obtaining a candidate symbol vector for the first transmission antenna, second transmission antenna, and the third transmission antenna by applying an interference cancellation on the symbol vector and each possible symbol for the third transmission antenna from the received signal;
obtaining another candidate symbol vector for the first transmission antenna, second transmission antenna, and the third transmission antenna within a present distance from the candidate symbol vector for the first transmission antenna, second transmission antenna, and the third transmission antenna; and
obtaining a symbol vector for the first transmission antenna, second transmission antenna, and the third transmission antenna based on the another candidate symbol vector for the first transmission antenna, second transmission antenna, and the third transmission antenna.

10. An apparatus of a reception device in a wireless communication system, the apparatus comprising:
a transceiver configured to receive a signal that is transmitted through a plurality of transmission antennas of a transmission device, wherein the plurality of transmission antennas comprise a first transmission antenna and a second transmission antenna; and
at least one processor configured to:
obtain a candidate symbol vector for the first transmission antenna and the second transmission antenna by applying an interference cancellation on a candidate symbol for the first transmission antenna and each possible symbol for the second transmission antenna from the received signal;
obtain another candidate symbol vector for the first transmission antenna and the second transmission antenna among symbol vectors within a preset distance from the candidate symbol vector based on a maximum likelihood (ML) metric for the symbol vectors; and
obtain a symbol vector for the first transmission antenna and the second transmission antenna based on the another candidate symbol vector.

11. The apparatus of claim 10, wherein the at least one processor is further configured to obtain candidate symbols for the first transmission antenna comprising the candidate symbol by applying an interference cancellation on each possible symbol for the first transmission antenna from the received signal.

12. The apparatus of claim 11, wherein the candidate symbols are identified from vectors having an inconsecutive likelihood size order, among temporary solution vectors comprising symbols possibly transmitted from the first transmission antenna.

13. The apparatus of claim 11, wherein the candidate symbols are identified based on at least one of an input received at the reception device, a modulation and coding scheme (MCS) level, a channel quality between the reception device and the transmission device, or a bit error rate (BER).

14. The apparatus of claim 11, wherein the at least one processor is further configured to:
identify a first combination of symbols transmitted from the first transmission antenna and the second transmission antenna by searching for at least one other symbol vector within a preset distance from a first symbol vector, and
identify a second combination of symbols transmitted from the first transmission antenna and the second transmission antenna by searching for at least one other symbol vector within a preset distance from a second symbol vector,
wherein the first symbol vector is determined from combinations of one of the candidate symbols and symbols possibly transmitted from the second transmission antenna, and
wherein the second symbol vector is determined from combinations of another one of the candidate symbols and symbols possibly transmitted from the second transmission antenna.

15. The apparatus of claim 14, wherein the at least one processor is further configured to, if the first combination and the second combination are identical, replace the second combination with a symbol combination which is different from the second combination among the combinations of the another one of the candidate symbols and symbols possibly transmitted from the second transmission antenna.

16. The apparatus of claim 14, wherein the at least one other symbol vector within the preset distance from the second symbol vector is different from the at least one other symbol vector within the preset distance from the first symbol vector.

17. The apparatus of claim 14, wherein the second combination is further determined by searching for at least one other symbol vector which exceeds the preset distance from the second symbol vector.

18. The apparatus of claim 10,
wherein the plurality of transmission antennas further comprise a third transmission antenna, and
wherein the at least one processor is further configured to:
obtain a candidate symbol vector for the first transmission antenna, second transmission antenna, and the third transmission antenna by applying an interference cancellation on the symbol vector and each possible symbol for the third transmission antenna from the received signal;
obtain another candidate symbol vector for the first transmission antenna, second transmission antenna, and the third transmission antenna within a present distance from the candidate symbol vector for the first transmission antenna, second transmission antenna, and the third transmission antenna; and obtain a symbol vector for the first transmission antenna, second transmission antenna, and the third transmission antenna based on the another candidate symbol vector for the first transmission antenna, second transmission antenna, and the third transmission antenna.

\* \* \* \* \*